US007694135B2

(12) United States Patent
Rowan et al.

(10) Patent No.: US 7,694,135 B2
(45) Date of Patent: Apr. 6, 2010

(54) SECURITY SYSTEMS AND SERVICES TO PROVIDE IDENTITY AND UNIFORM RESOURCE IDENTIFIER VERIFICATION

(75) Inventors: Michael J. Rowan, Wakefield, RI (US); Christopher T. M. Bailey, Atlanta, GA (US); Kefeng Chen, Duluth, GA (US); Neal Creighton, Waltham, MA (US)

(73) Assignee: Geotrust, Inc., Mountain View, CA (US)

( * ) Notice: Subject to any disclaimer, the term of this patent is extended or adjusted under 35 U.S.C. 154(b) by 1268 days.

(21) Appl. No.: 11/184,049

(22) Filed: Jul. 18, 2005

(65) Prior Publication Data

US 2006/0015722 A1 Jan. 19, 2006

Related U.S. Application Data

(60) Provisional application No. 60/588,570, filed on Jul. 16, 2004, provisional application No. 60/633,464, filed on Dec. 6, 2004.

(51) Int. Cl.
*H04L 29/00* (2006.01)
(52) U.S. Cl. .................. 713/166; 713/162; 713/167; 713/173
(58) Field of Classification Search .................. 713/162, 713/166, 167, 173
See application file for complete search history.

(56) References Cited

U.S. PATENT DOCUMENTS

| 5,623,600 A | 4/1997 | Ji et al. |
| 5,630,066 A | 5/1997 | Gosling |
| 5,802,518 A | 9/1998 | Karaev |
| 5,855,020 A | 12/1998 | Kirsch |
| 5,864,667 A | 1/1999 | Barkan |
| 5,867,651 A | 2/1999 | Dan et al. |
| 5,875,440 A | 2/1999 | Cooperman et al. |
| 5,894,554 A | 4/1999 | Lowery |
| 5,895,470 A | 4/1999 | Pirolli et al. |
| 5,896,533 A | 4/1999 | Ramos et al. |
| 5,903,882 A | 5/1999 | Asay et al. |
| 5,935,207 A | 8/1999 | Logue et al. |

(Continued)

FOREIGN PATENT DOCUMENTS

GB 2 259 590 3/1993

(Continued)

OTHER PUBLICATIONS

Capt James M. Hayes; "The Problem with Multiple Roots in Web Browsers—Certificate Masquerading"; The Office of INFOSEC Research and Technology; IEEE, Jun. 17-19, 1998 pp. 306-311.*

(Continued)

*Primary Examiner*—Carl Colin
(74) *Attorney, Agent, or Firm*—Townsend and Townsend and Crew LLP

(57) ABSTRACT

A service is provided to allow a user, such as an API or web service, Internet input, or software or hardware client to perform a search on any one or multiple Uniform Resource Identifier (URI) and/or other protocol addresses accessible via a public or private network to establish a report in a summary and/or detailed format on the trustworthiness of the address.

39 Claims, 22 Drawing Sheets

U.S. PATENT DOCUMENTS

| | | | |
|---|---|---|---|
| 5,961,591 | A | 10/1999 | Jones et al. |
| 5,982,898 | A | 11/1999 | Hsu et al. |
| 5,983,348 | A | 11/1999 | Ji |
| 6,018,724 | A | 1/2000 | Arent |
| 6,018,801 | A | 1/2000 | Palage et al. |
| 6,026,166 | A | 2/2000 | Lebourgeois |
| 6,035,402 | A | 3/2000 | Vaeth et al. |
| 6,044,462 | A | 3/2000 | Zubeldia et al. |
| 6,058,383 | A | 5/2000 | Narasimhalu et al. |
| 6,065,055 | A | 5/2000 | Hughes et al. |
| 6,131,162 | A | 10/2000 | Yoshiura et al. |
| 6,134,658 | A | 10/2000 | Multerer et al. |
| 6,154,844 | A | 11/2000 | Touboul et al. |
| 6,157,930 | A | 12/2000 | Ballard |
| 6,199,052 | B1 | 3/2001 | Mitty et al. |
| 6,209,029 | B1 | 3/2001 | Epstein et al. |
| 6,226,624 | B1 | 5/2001 | Watson et al. |
| 6,233,618 | B1 | 5/2001 | Shannon |
| 6,234,978 | B1 | 5/2001 | Tuzhillin |
| 6,247,007 | B1 | 6/2001 | Cooperman et al. |
| 6,247,133 | B1 | 6/2001 | Palage et al. |
| 6,275,941 | B1 | 8/2001 | Saito et al. |
| 6,301,658 | B1 | 10/2001 | Koehler |
| 6,327,656 | B2 | 12/2001 | Zabetian |
| 6,351,812 | B1 | 2/2002 | Datar et al. |
| 6,357,010 | B1 | 3/2002 | Viets et al. |
| 6,442,689 | B1 | 8/2002 | Kocher |
| 6,499,105 | B1 | 12/2002 | Yoshiura et al. |
| 7,003,661 | B2 | 2/2006 | Beattie et al. |
| 7,114,177 | B2 * | 9/2006 | Rosenberg et al. ............. 726/4 |
| 7,165,718 | B2 * | 1/2007 | Blancas et al. ............. 235/380 |
| 7,203,753 | B2 * | 4/2007 | Yeager et al. ............... 709/225 |
| 7,343,351 | B1 * | 3/2008 | Bishop et al. ................. 705/67 |
| 2001/0042050 | A1 | 11/2001 | Fletcher et al. |
| 2002/0032665 | A1 | 3/2002 | Creighton et al. |
| 2002/0035686 | A1 | 3/2002 | Creighton et al. |
| 2002/0049738 | A1 * | 4/2002 | Epstein .......................... 707/1 |
| 2002/0059364 | A1 | 5/2002 | Coulthard et al. |
| 2002/0112034 | A1 | 8/2002 | Feik |
| 2002/0147895 | A1 * | 10/2002 | Glance et al. ............... 711/158 |
| 2003/0023878 | A1 | 1/2003 | Rosenberg et al. |
| 2004/0034605 | A1 | 2/2004 | Khaishgi et al. |
| 2004/0034635 | A1 * | 2/2004 | Czarnecki et al. ............. 707/7 |
| 2004/0107363 | A1 | 6/2004 | Monteverde |
| 2005/0131866 | A1 * | 6/2005 | Badros et al. .................. 707/3 |
| 2005/0166262 | A1 | 7/2005 | Beattie et al. |
| 2005/0182745 | A1 * | 8/2005 | Dhillon et al. ................. 707/1 |
| 2005/0256866 | A1 * | 11/2005 | Lu et al. ......................... 707/5 |
| 2005/0256960 | A1 * | 11/2005 | Ganesh et al. ............. 709/229 |
| 2006/0053483 | A1 | 3/2006 | Beattie et al. |

FOREIGN PATENT DOCUMENTS

| | | |
|---|---|---|
| GB | 2 308 688 | 7/1997 |
| WO | WO 97/43717 A | 11/1997 |
| WO | WO 97/50036 | 12/1997 |
| WO | WO 99/30218 | 6/1999 |
| WO | WO 00/46681 | 8/2000 |
| WO | WO 02/06932 | 1/2002 |
| WO | WO 02/07377 | 1/2002 |
| WO | WO 02/073364 | 9/2002 |
| WO | WO 02/077793 | 10/2002 |
| WO | WO 02/077831 | 10/2002 |
| WO | WO 02/078259 | 10/2002 |
| WO | WO 02/082716 | 10/2002 |
| WO | WO 03/032572 | 4/2003 |

OTHER PUBLICATIONS

Zishuang (Eileen) Ye, Sean Smith; "Trusted Paths for Browsers: An Open-Source Solution to Web Spoofing"; Department of Computer Science Dartmouth College Technical Report TR2002-418 "www.cs.dartmouth.edu/~pkilab/demos/spoofing/"; Feb. 4, 2002; pp. 1-11.*

U.S. Appl. No. 09/311,607, Coulthad et al.

U.S. Appl. No. 09/312,751, Coulthad et al.

U.S. Appl. No. 10/471,701, Rosenberg et al.

U.S. Appl. No. 09/661,873, McLeod et al.

Spinellis, D., "Trusted Third Party Services for Deploying Secure Telemedical Applications over the WWW," Computers & Security, International Journal Devoted to the Study of the Technical and Financial Aspects of Computer Security, 1999, pp. 627-639, vol. 18, No. 7, Elsevier Science Publishers, Amsterdam.

Press, J., "Secure Transfer of Identity and Privilege Attributes in an Open Systems Environment," Computers & Security, International Journal Devoted to the Study of the Technical and Financial Aspects of Computer Security, Apr. 1, 1991, pp. 117-127, vol. 10, No. 2, Elsevier Science Publishers, Amsterdam.

Lopez, J., et.al., "An User Authentication Infrastructure for Extranet Applications,".

Proceedings 33rd Annual 1999, International Camahan Conference on Security Technology, Madrid, Spain, Oct. 5-7, 1999, IEEE International Camahan Conference on Security Technology, IEEe, US, Oct. 5, 1999, pp. 354-362, vol. Conf. 33, New York, NY.

Anonymous, Internet, "BYU's Web Filter Keeps Smut Away from Student," Cancereweekly Plus, Apr. 1997, pp. 12-13.

Gornstein, L., "Bill May Link Cyber Filters, School Funds/Legislation: The law would require that devices be installed on student computers," Orange County Register, Feb. 1998, pp. 1-2.

Anonymous, Merriam-Webster's Collegiate Dictionary, Merriam-Webster, Incorporated, Tenth Edition, 2001, p. 1372.

Chu, et al., "PICS Signaled Labels (Dsig) 1.0 Specification," www.w3.org/TR/REC-Dsig-label/, May 1998.

Dean, D., et al., Java Security: From Hotjava to Netscape and Beyond, Proceedings of the 1996 IEEE Symposium on Security and Privacy, Oakland, CA, May 8, 1996.

Hamilton, M.A., Java and Shift to Net-Centric Computing, Computer, vol. 29, No. 8, Aug. 1996, pp. 31-39.

* cited by examiner

SECURITY SYSTEMS AND SERVICES TO PROVIDE IDENTITY AND UNIFORM RESOURCE IDENTIFIER VERIFICATION

CROSS-REFERENCE TO RELATED APPLICATIONS

This application claims priority from provisional application Ser. Nos. 60/588,570, filed Jul. 16, 2004; and 60/633,464, filed Dec. 6, 2004; each of which is incorporated herein by reference. Application Ser. No. 10/039,986, published as 2003/0023878, is also incorporated herein by reference.

BACKGROUND

A scam referred to as a phishing attack occurs when someone uses a spoofed email and/or fraudulent website designed to fool users into divulging personal and/or confidential information, such as financial data, credit card numbers, expiration dates, passwords, mother's maiden name, and account numbers. For example, a perpetrator of such a scam sends out a spam email that appears to come from a reputable institution. For example, the sender of the email appears to be "support@bank.com". At little cost, such an email could be sent to millions of recipients, of which some percentage will likely be customers of the particular bank. The email tries to induce the recipients to enter personal information, as an example, by telling the users that there have been fraudulent charges to their credit card and that the users should enter their account number and password information to fix the problem.

In a variation on this approach, the email has a link that is supposedly a link to the bank's website. The website can have a name that is similar to the bank's name, or there can be ways to overlay text to block the website name to make it appear to be valid. A user can find himself or herself viewing a website that is made to look like the one that the bank actually uses. The user thinks he/she is logging in normally to the bank, but the user is actually divulging personal information. The perpetrator of the scam can thus obtain the account number and password not only to use for that particular bank, but the password may be useful for the perpetrator to use for other illegal purposes.

Many parties can suffer losses, directly and indirectly, as a result of such activity. Users are harmed by false charges to their bills, and also by the inconvenience of having to get new cards and change passwords. The company with the spoofed website may have to absorb some of the costs of fraudulent charges, loses some creditability with customers and thus may lose customers, and also loses time and expense in helping the customer address the problem. Additionally, all electronic commerce could be susceptible to a lack of confidence in transactions over the internet.

Currently, confidential communications can be maintained over the internet through the Secure Sockets Layer protocol (SSL), also known as Transport Layer Security (TLS). SSL allows users to securely exchange information over the Internet during a session between the user and a website. After a set of introductory messages, a website sends a certificate containing a public key to the user, while the website maintains a private key. The user uses the public key to encrypt a coded message to the website with a secret key. The website decodes the message to derive the secret key, and then the user and the website use the secret key to send information back and forth as long as the user and the website are in the same session.

The SSL process of establishing a secure communication occurs without the steps being readily apparent to the user. To the user there are two indications that SSL is being used: (1) the web address includes "https" instead of "http," and (2) a padlock icon appears at the bottom of the web browser. For users who are more advanced in their knowledge about security, this padlock can be used to view certificate information, such as the certificate serial number, certificate validity dates, public key information, and various other details about the certificate. This information can indicate to the advanced user that communications are secure and that the user is communicating with the party that the user thinks he/she is communicating with (i.e., that the site is authentic). Such information, however, can be circumvented by perpetrators of a phishing scam to deceive even the advanced user. For example, the https address can be doctored; and/or the certificate that is being provided could be out of date, a shared certificate, or a certificate that has been revoked.

The certificate authorities that issue certificates each maintain a certificate revocation list (CRL) or some additional mechanism that shows if a certificate has been revoked before its scheduled expiration date. A certificate can be revoked for one of a number of reasons, such as at the request of a certificate holder or because of a concern that the private key associated with the certificate has been compromised. The certificate authorities typically provide a service that allows access to their CRLs or other certificate status mechanisms.

Even an advanced user who accesses a secure website typically does not check the certificate or perform further checks to make sure that the certificate is valid. These advanced users generally have confidence that the information that they are sending is safe and secure. This confidence helps to allow commerce to be done over the Internet. If that confidence is lost, and if the procedure for a user to confirm the validity of a website is time consuming or complex, internet commerce could suffer significantly.

SUMMARY

A service is provided to allow a user, such as an API or web service, Internet input, or software or hardware client, each in batch or single mode, to perform a search on any one or multiple Uniform Resource Identifiers (URIs) and/or other protocol addresses (i.e., email) (referred to here as an address) accessible via a public or private network in clear or secure mode to establish a report in a summary and/or detailed format on the trustworthiness of the address, i.e., a trustworthiness report. The service can use databases to perform multiple different types of checks to establish the trustworthiness report of the address, the company, operators, and additional information and other information that is associated with the address, and can provide a summary trustworthiness report to users on any desired scale, such as on a scale of 1-5, 0-100, or A-E, and can provide intelligent and intuitive information and recommendations in the trustworthiness report of the address that the sophisticated, advanced and/or novice user would understand. This score can be provided in strictly an advisory manner, such that it is up to the user to decide whether to continue to interact with that address. A user could check the trustworthiness report that is obtained by the service and if that trustworthiness report is below a threshold amount, take additional security measures or inhibit access to the address altogether.

The system can also provide a toolbar, such as an Internet browser or email client toolbar, that has useful tools to help prevent phishing and other types of attacks. The toolbar can include the ability to access the trustworthiness report and backup information, and can also have a user identifier that is drawn from the computer and an indication of the identified (uniform resource identifier) URI and/or fully qualified domain name (FQDN) that the user is supposed to be on, so that the user can compare this to the address as shown in the address line. The system can provide trustworthiness report information to users while viewing search results within a standard search engine format. The user can access the trustworthiness report information and backup information directly in the search results and does not have to travel to the actual link.

Other features and advantages will become apparent from the following drawings and descriptions.

DESCRIPTION

General Implementation

Figure 1:
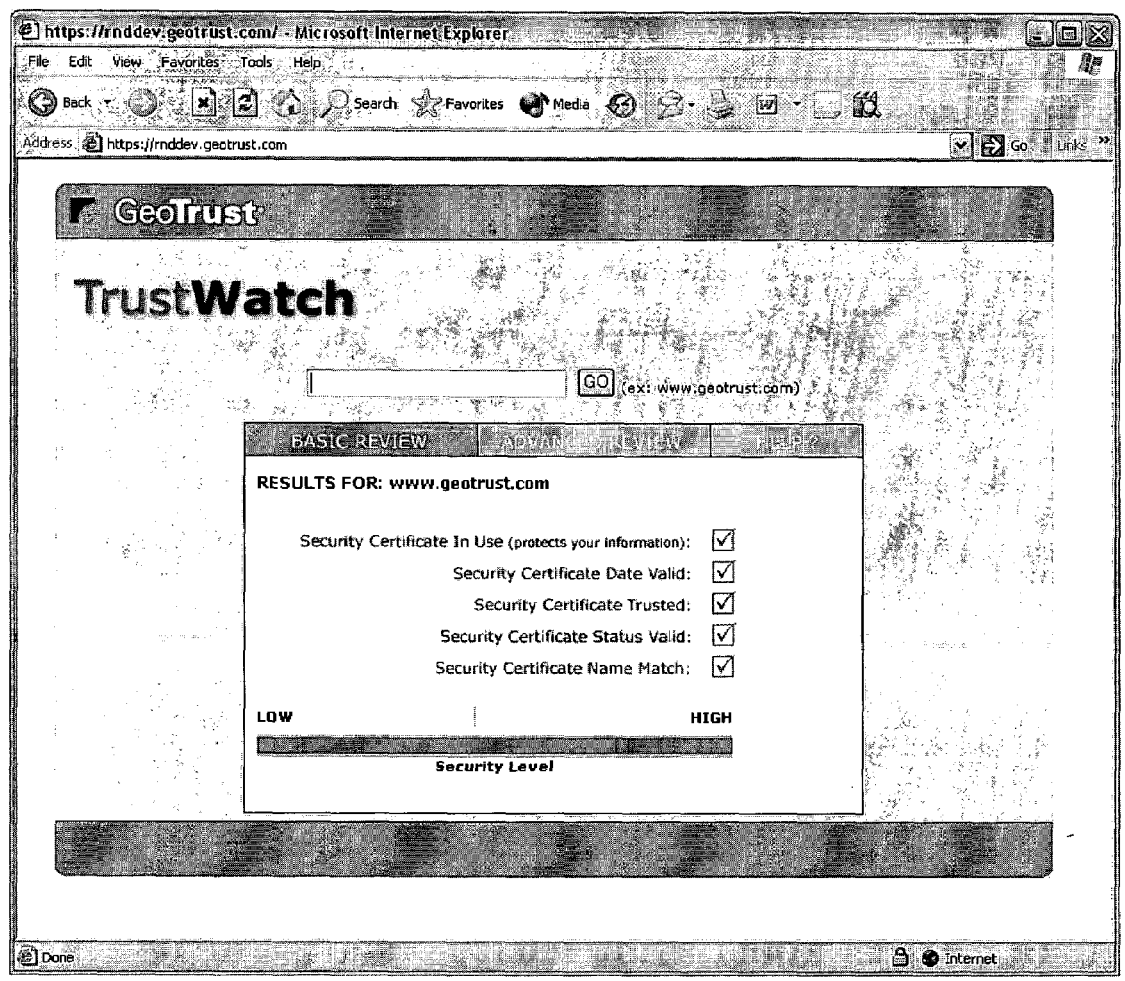
FIGS. 1-6 are screen shots of various examples of results and scores, and applications for the system and service.

In one implementation, the service includes a search site that allows a user or system to provide an address and perform a search. As described in detail below, once the address is entered, the service uses the address and checks for SSL activity, and can check the domain name, owners, company, service providers, certificate issuer and other information against lists, such as existing and custom blacklists, whitelists, spam lists, phishing lists, trust lists, government lists, and other lookup and search systems. The service uses these pieces of information to assign a trustworthiness score to the address which was searched, and this information can be displayed or returned to the user in a more detailed trustworthiness report.

As an example, information can include a registered party (company/website owner) and contact information relating to the issuing trust authority for the SSL certificate and fraud protection/reporting agencies, as well as links to relevant seal and agency programs.

Examples of tests and data sources (lists) include:
Secure Sockets Layer protocol (SSL)/Transport Layer Security (TLS)
Better Business Bureau (BBB)
Dun & Bradstreet (D&B)
CNET
BizRate
Scan Alert
Alexa.com
Shopping.com
Verified By Visa
Mastercard Secure Code
Charge Card, Credit Card, Debit Card, and Purchase Card Merchant Data
MySimon.com
PriceGrabber.com
Price.com
TRUSTe
Customer Satisfaction Sources (CS)
Secretaries of State
Office of Foreign Access Control (OFAC)
Credit Bureaus (business and personal)
Who is data lookup
Search engine lookup
Phishing, SPAM, Blacklists, Whitelists, Custom Lists and other repositories of information
Security Survey list and data sources
Hoster Lists
Fortune 100/500/1K and additional companies
Custom Lists such as: Certification Authorities Trustworthiness status and product differences
Telephone Lists Input operations can be done through an API or web service, Internet input, or software or hardware client; and output operations can be provided through an API or web service, Internet response, or software or hardware client. The input and output operations can all be done in batch or single mode.

In the case of SSL scoring, specific checks can be performed in any order and additional or fewer checks can be included. The first part of performing the SSL scoring includes establishing a connection to the address that the user is reviewing. For performing a SSL scoring process, the system has access to some database and service information. This information can include:
List of Root and Subordinate Certificate Authorities (CAs)
List of top-level domains (TLDs)
Ability to interact with Lists.
Ability to perform DNS lookups and translations For the initial SSL check, when a user enters an address, the service tries to establish a SSL handshake, resulting in the capture of certificate details. The initial results could be in one of the following:
a) Not Found
b) Not Trusted (Issued by a Private Certification Authority)
c) Trusted (Issued by a Public/Ubiquitous Certification Authority)
d) Expired
e) Revoked
f) Name Mismatch
g) Wildcard Status In some cases, the results from the SSL check will produce a "zero" or "no trust" score outright, such as if the initial result is "revoked." For others, further checks are performed. In any case, a combination of lists and calculations can be used. For example if the certificate is self-signed but is also on a black list, a red warning would typically result. Whereas if a certificate were simply self-signed, a yellow not verified result would typically be provided.

In addition, one or more of the other lists can be accessed. In each case, there can be various levels of responses to the results from checking a list. In some cases, the check can result in a yes/no response—the name is or is not on a list. In other cases, the result can be more complicated. For example, a list may have different categories, such as approved, not approved, and questionable, it could have a score, such as a 1-10 rating. Still other lists may provide raw data from which the service extracts a result—e.g., a business complaint list might indicate a number of open complaints and resolutions, and expect the user to interpret the data as the user desires.

For a small number of lists and results, simple formulas could be used. For example, criteria can be established for each list, and points are added or deducted if the check passes or fails. To simplify the business complaint list, more than one unresolved complaint could result in a "fail" while zero or one unresolved complaint might result in a "pass."

A summary trustworthiness report or a single letter or numerical score can have at least two values for trustworthy or not. It can also be useful to have multiple levels of results to provide to users, such as at least 5 different degrees, such as a scale of A-E or 1-5, and many other values can be used, e.g., a score of 0-100 with every integer used in the range. The score on the trustworthiness of an address can be calculated in one of many ways. One way that can be used to take into account the complexities of many different types of lists and results is through the use of a master regression formula. An example of a master regression formula is:

$$T = \Sigma C_i V_i + A$$

Where $V_i$ is a calculated result of the $i^{th}$ data source and $C_i$ is a coefficient for $i^{th}$ data source, and A is a constant.

Each $V_i$ in turn is calculated as:

$$V_i = \Sigma E_i U_i + M$$

Where $U_i$ is an assigned value on the data source $V_i$ and $E_i$ is a coefficient assigned in order to weight the $U_i$. M is a weighting constant for data source $V_i$. Examples of data sources $V_i$ are included in Lists defined above (i.e., SSL, BBB, D&B, OFAC, etc.). In one example, the $V_i$ regression formula is used to produce a result as indicated in Table I below (data source i is a digital certificate information source, so CA refers to certificate authorities, and S1-S3 refer to situations).

TABLE I

| | S1 | S2 | S3 |
|---|---|---|---|
| CA1 | 0.5 | 0.4 | 0.3 |
| CA2 | 0.4 | 0.4 | 0.2 |
| CA3 | 0.4 | 0.3 | 0.1 |
| CA4 | 0.3 | 0.2 | 0.2 |
| CA5 | 0.2 | 0.2 | 0.1 |

Users using the service can look at the basis of the trustworthiness report if requested. In this case, results and information compiled during the trustworthiness report process can be displayed in more detail.

Figure 2:
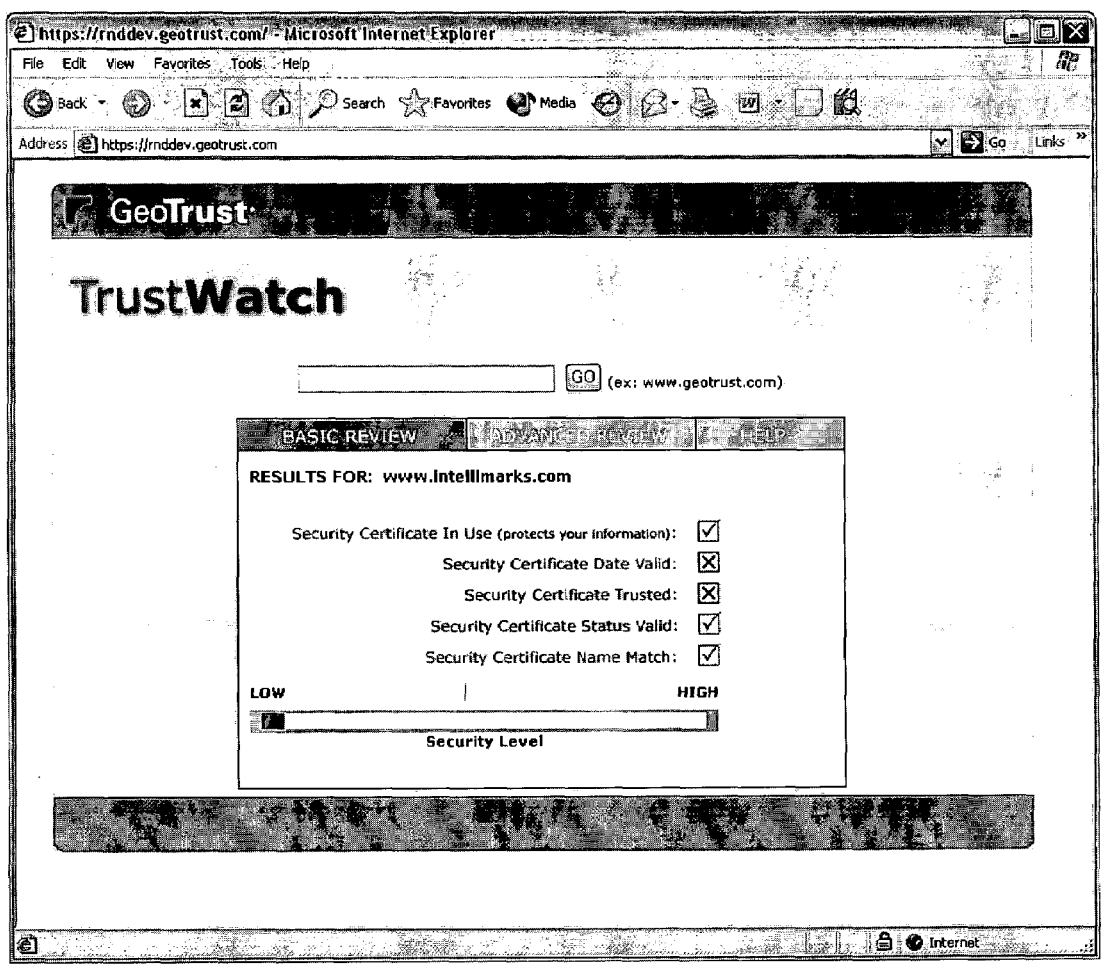
Figure 3:
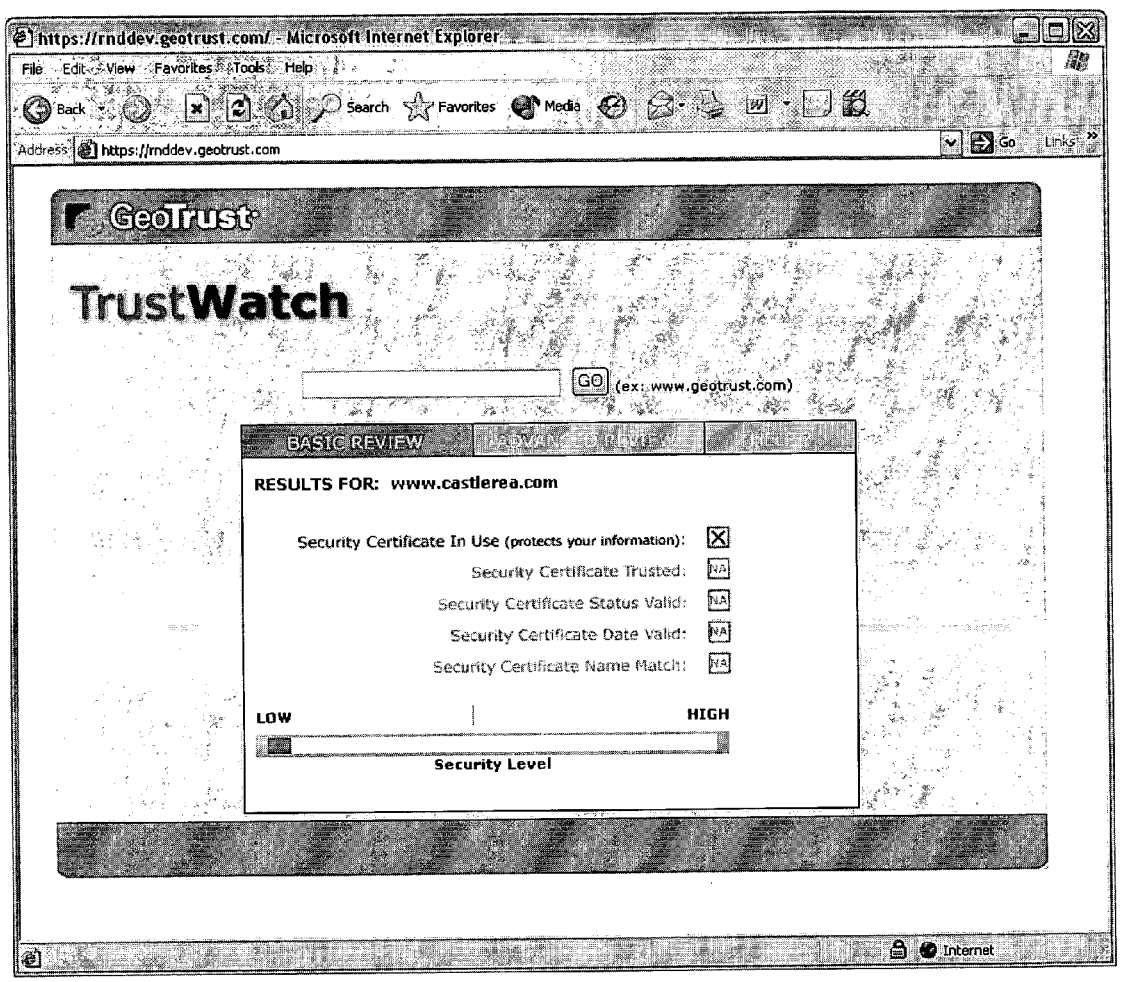

FIGS. 1-3 are screen shots showing examples of trustworthiness report results of search information if a user enters a search into the service or a website, process or application dedicated to utilize the service. As indicated in FIG. 1, a basic trustworthiness report review indicates that a security certificate is in use, it is valid, trusted, the status is valid, and the name of the site matches the name in the certificate. Consequently, the security level that is indicated is high. FIG. 2 shows an example of a case in which a security certificate is in use, its status is valid, and its name matches, but the certificate validity dates are not valid and the certificate is issued from a private CA. As a result, the trustworthiness report is shown as being low. In the case of FIG. 3, a security certificate is not in use, and thus further SSL checks are not done, but checks of other lists could be performed. The result that is provided is that the trustworthiness report is low.

With this type of service, a user can go to a website, enter an address, and get a trustworthiness report. In the event the trustworthiness report is low, the user still has the option to use that site if desired.

A system could use the security level to trigger further warnings, take additional measures, or even block access outright when utilizing the service. Blocking access may be used by companies in which users are using the Internet for work purposes, or could be used by users or by the owner of the computer to prevent other people from using the computer in an unsafe manner. The trustworthiness report could trigger additional security measures that could take place. These could be alert-oriented, such as providing additional screens periodically warning about entering or receiving certain data, or could take other forms, such as blocking incoming executables or scripts from being received.

A website that is remote to the user can be used, and can interact with the service for providing a trustworthiness report for the address. However, software and processing for performing such checks could be provided as part of a network, or as part of some other service.

Figure 9A:
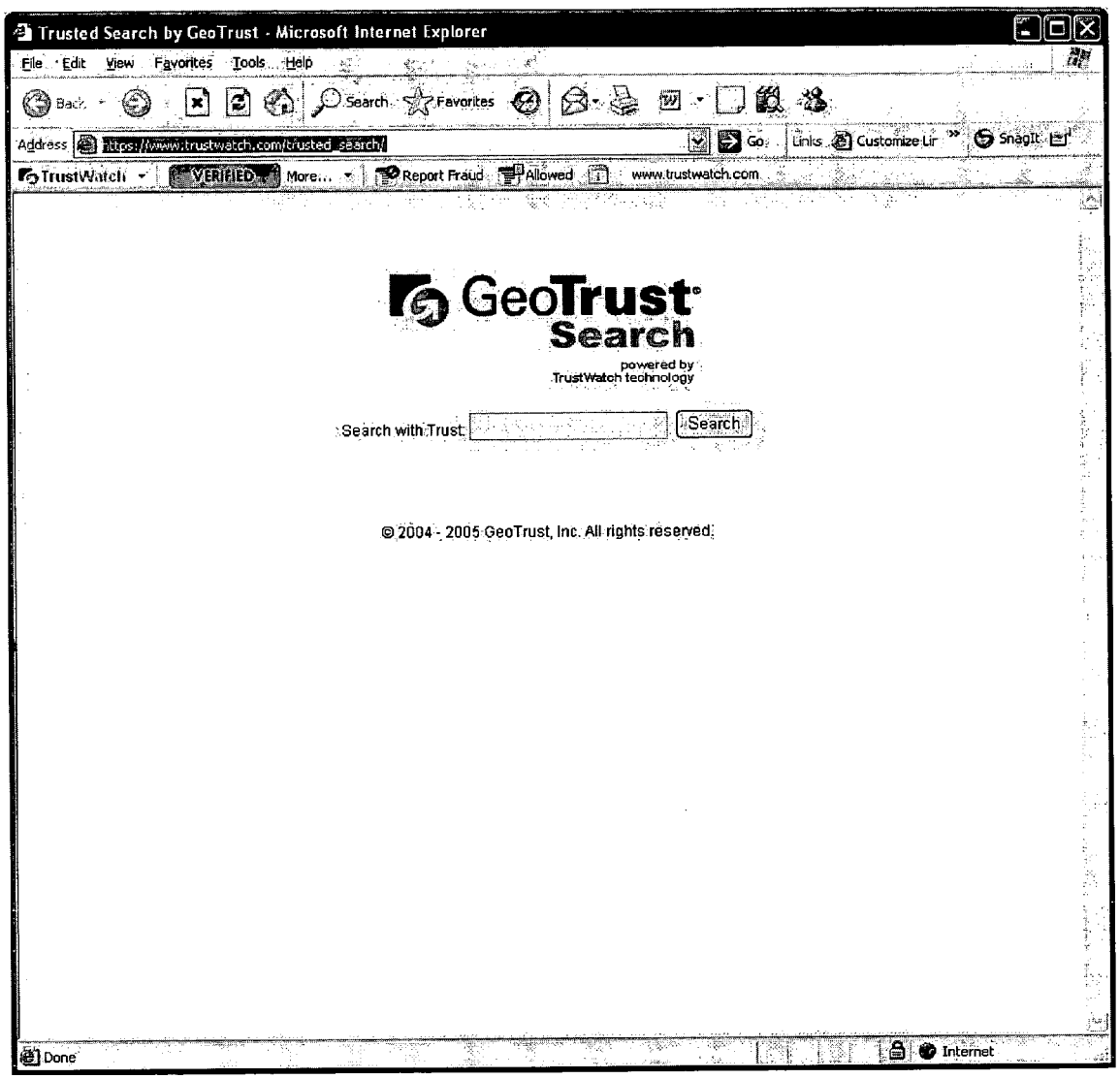
FIGS. 9(a)-9(c) are screenshots showing integration with a search engine.
Figure 9B:
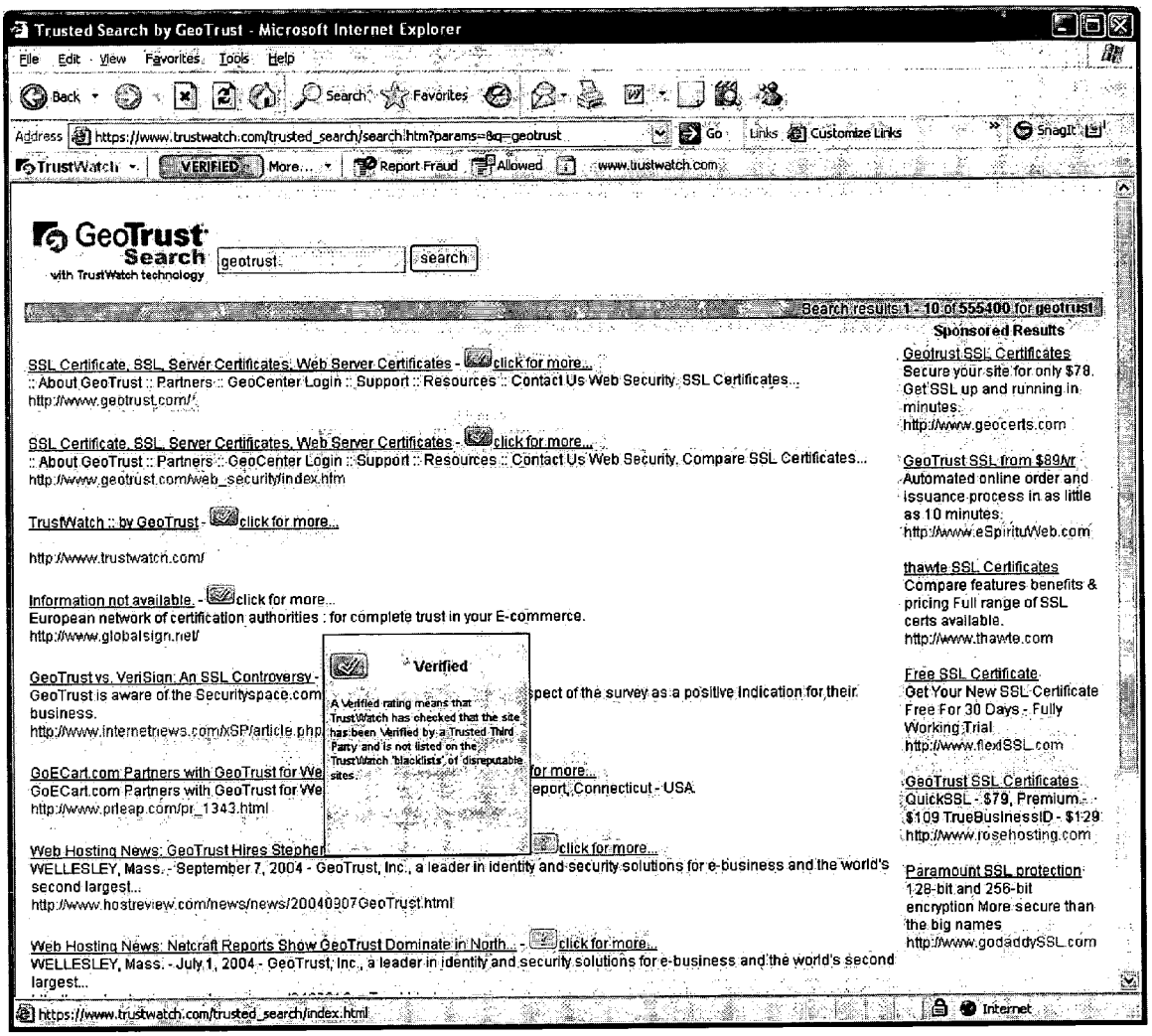
Figure 9C:
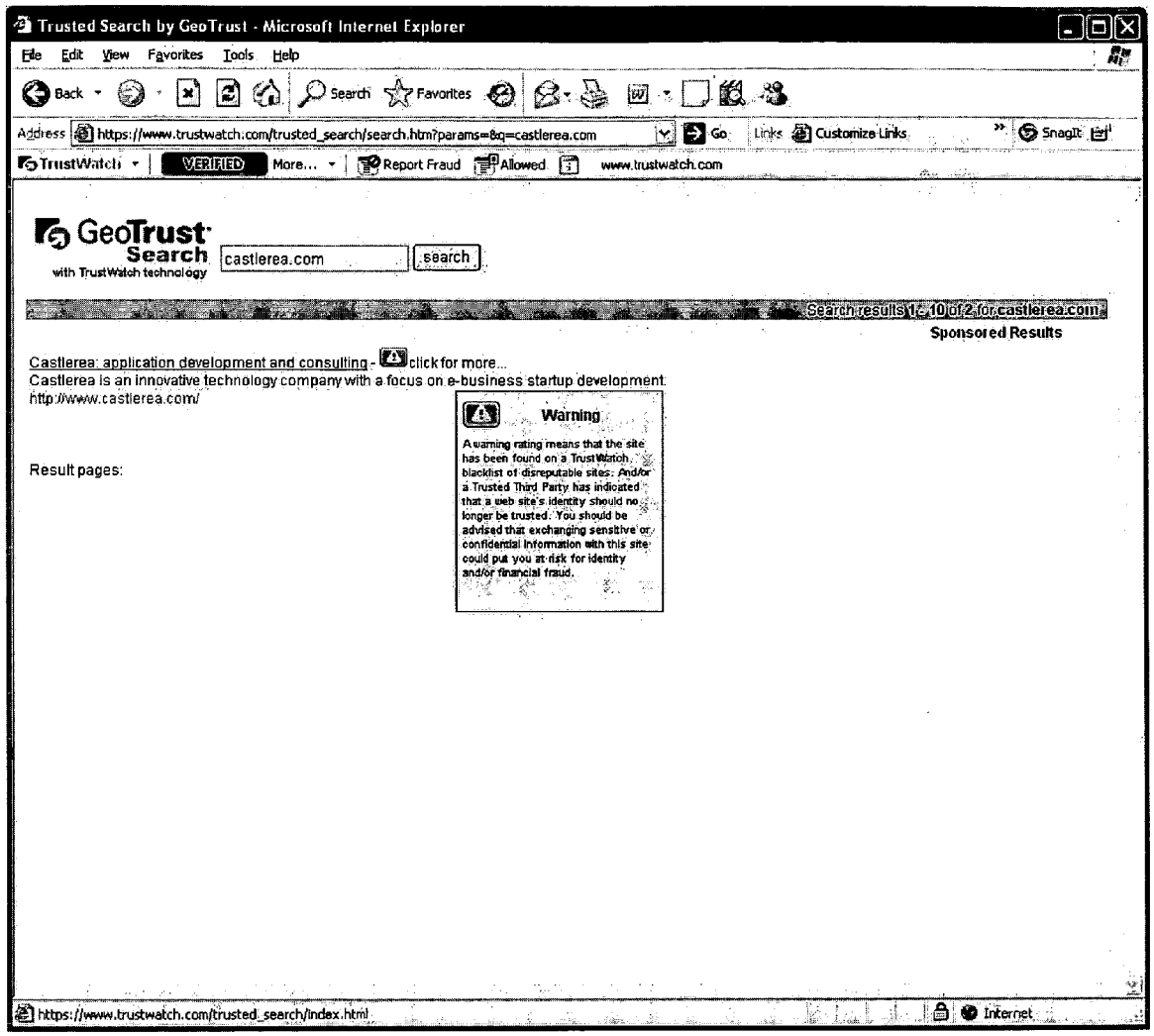

Referring to FIGS. 9(a)-9(c), in the case of another service, for example, a search engine could be used to provide results in response to a query. A user enters a query into a query page (FIG. 9(a)). As a result of that query, links are provided on a search results page (FIG. 9(b)). The service could automatically provide a trustworthiness report on each of the addresses that are on the search page, or at least provide a summary trustworthiness report. This summary report could take the form of an icon next to each link provided by the search to indicate that the location is verified, not verified (as in FIG. 9(c)), questionable, or some other indication. Clicking on, or passing a cursor arrow mouse over, the icon causes the system to provide an explanation of the icon. Alternatively, the search engine could provide a box that allows the user to obtain a trustworthiness report or score for each of the addresses on the page, or a box could be provided before or after each entry on the results page to allow the user to click on it before going to that page to get a trustworthiness report or score. The search engine could also limit its results to those that have a sufficient trustworthiness report or score. As indicated above, the search engine could provide the functionality and searching capability internally, or the addresses could be forwarded to another site or the service to provide the trustworthiness report.

Referring to FIGS. 8(a)-8(f), for each site, the service can provide a site report with a number of pieces of information about the site. The report provides the trustworthiness indicator, which can be a score or a summary (such as "verified"). The report can then provide other information or provide convenient links to other information, including security, user feedback, privacy, site statistics, site identity, and other information. The report can also include convenient links to report fraud, or to collect user feedback for trustworthiness or other issues.

Figure 8A:
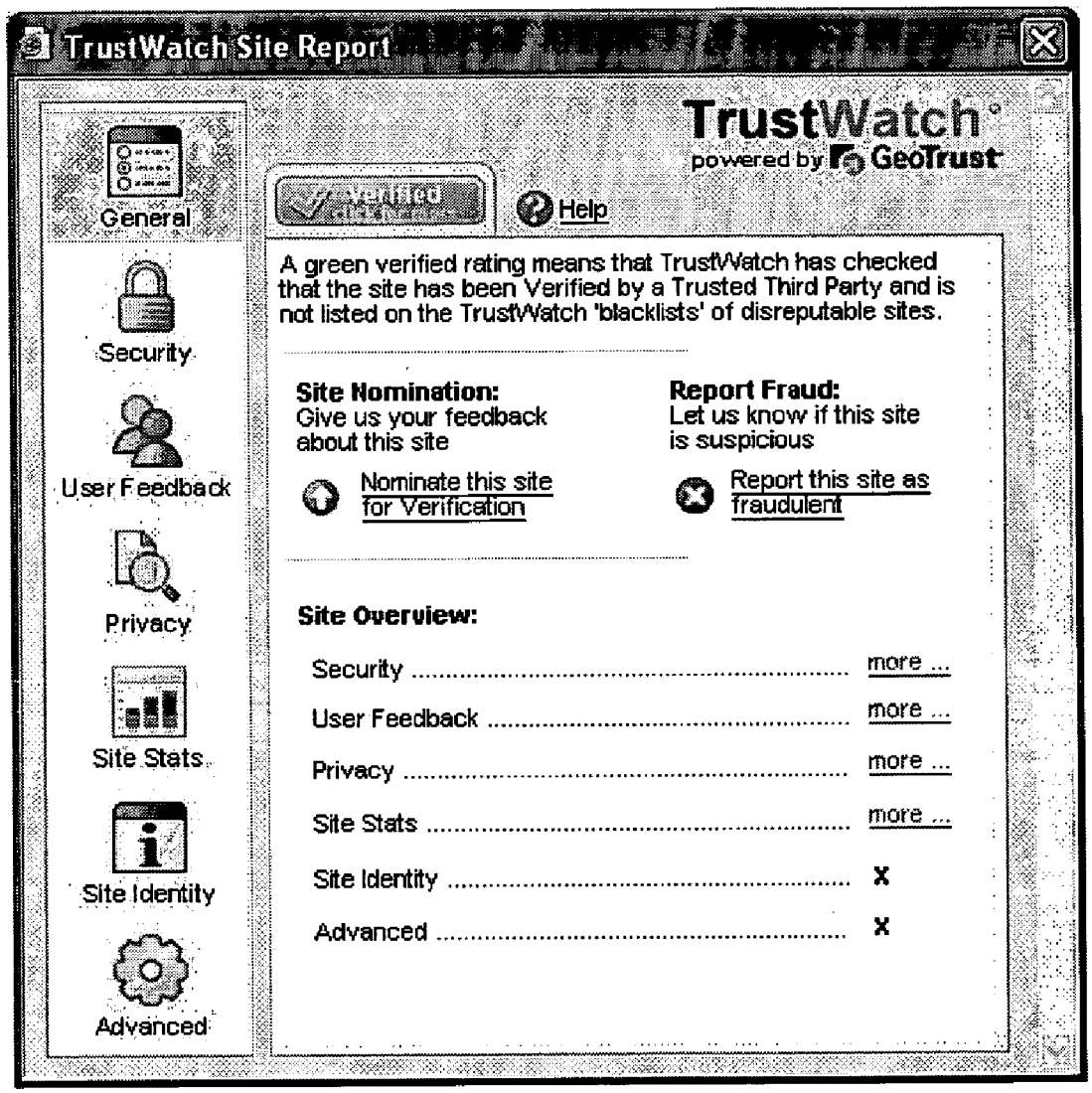
FIGS. 8(a)-8(f) are screen shots showing shots of a trustworthiness report with a menu of options, such as for security, privacy, user feedback, and statistics.
Figure 8B:
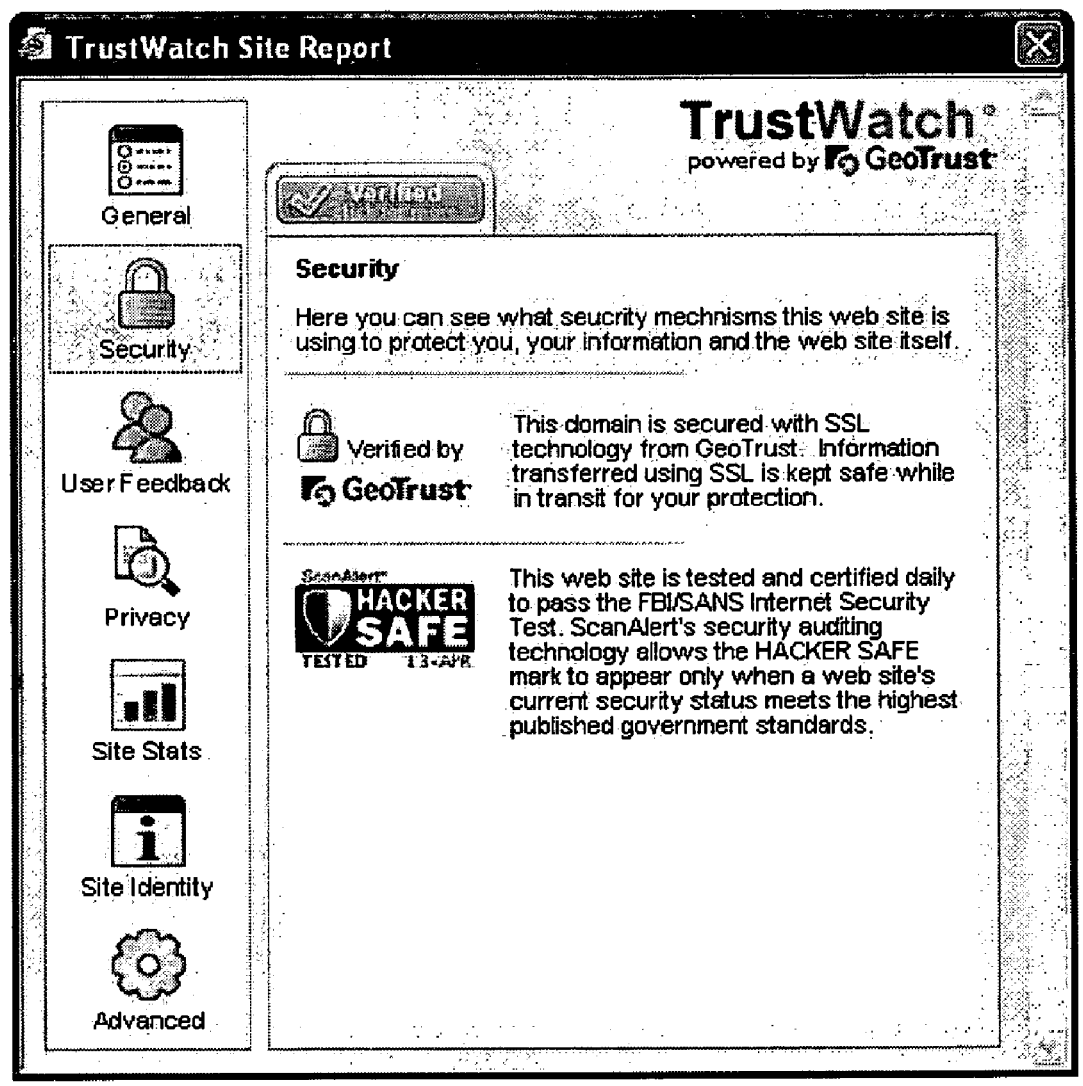

The security information (FIG. 8(b)) can include information about certificates, general information about SSL, and other certifications or approvals, such as a "hacker safe" indication.

Figure 8C:
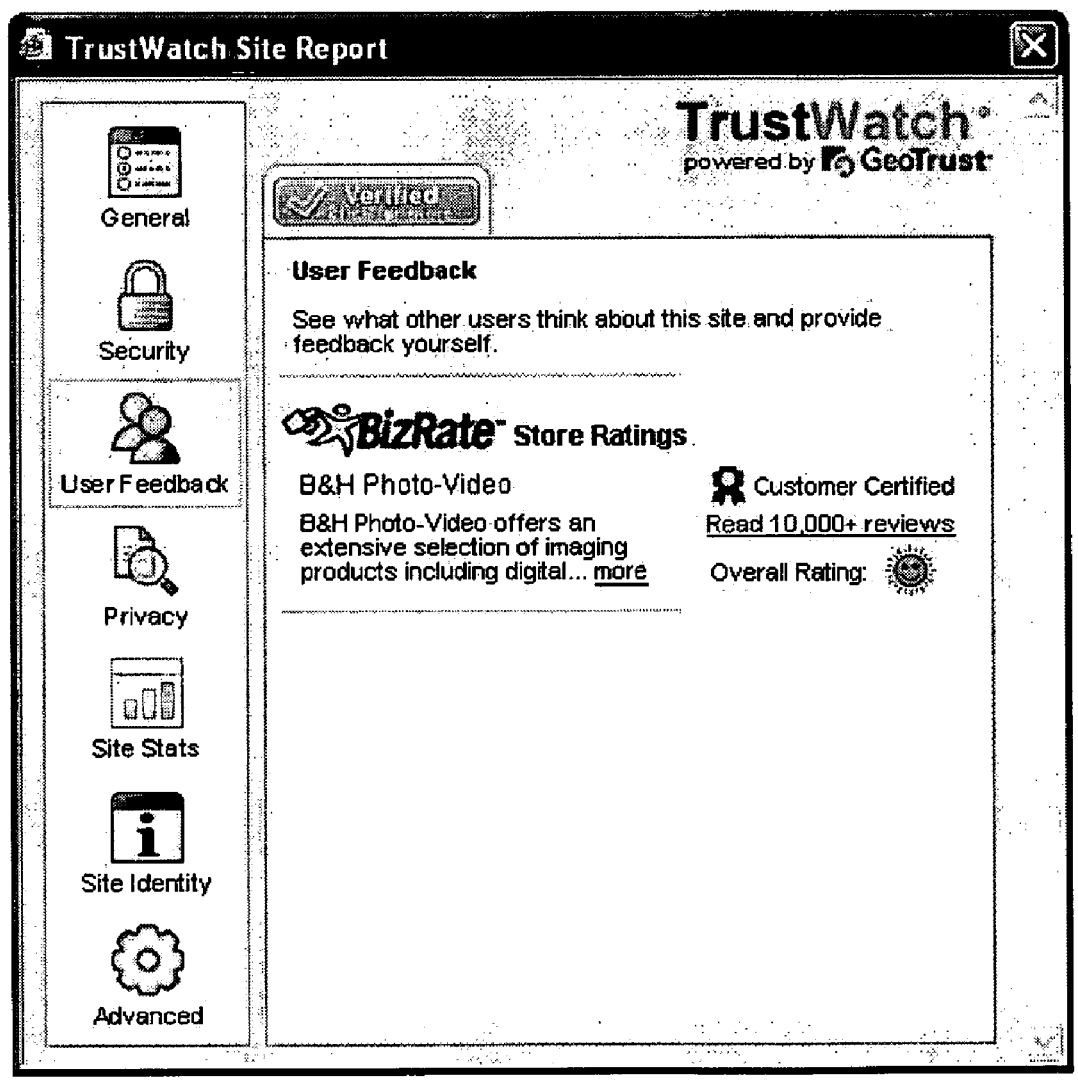
Figure 8D:

The user feedback information (FIGS. 8(c) and 8(d)) can include web site reviews or summaries of such reviews from rating and feedback services, links to ratings services, and an option to enter feedback.

Figure 8E:
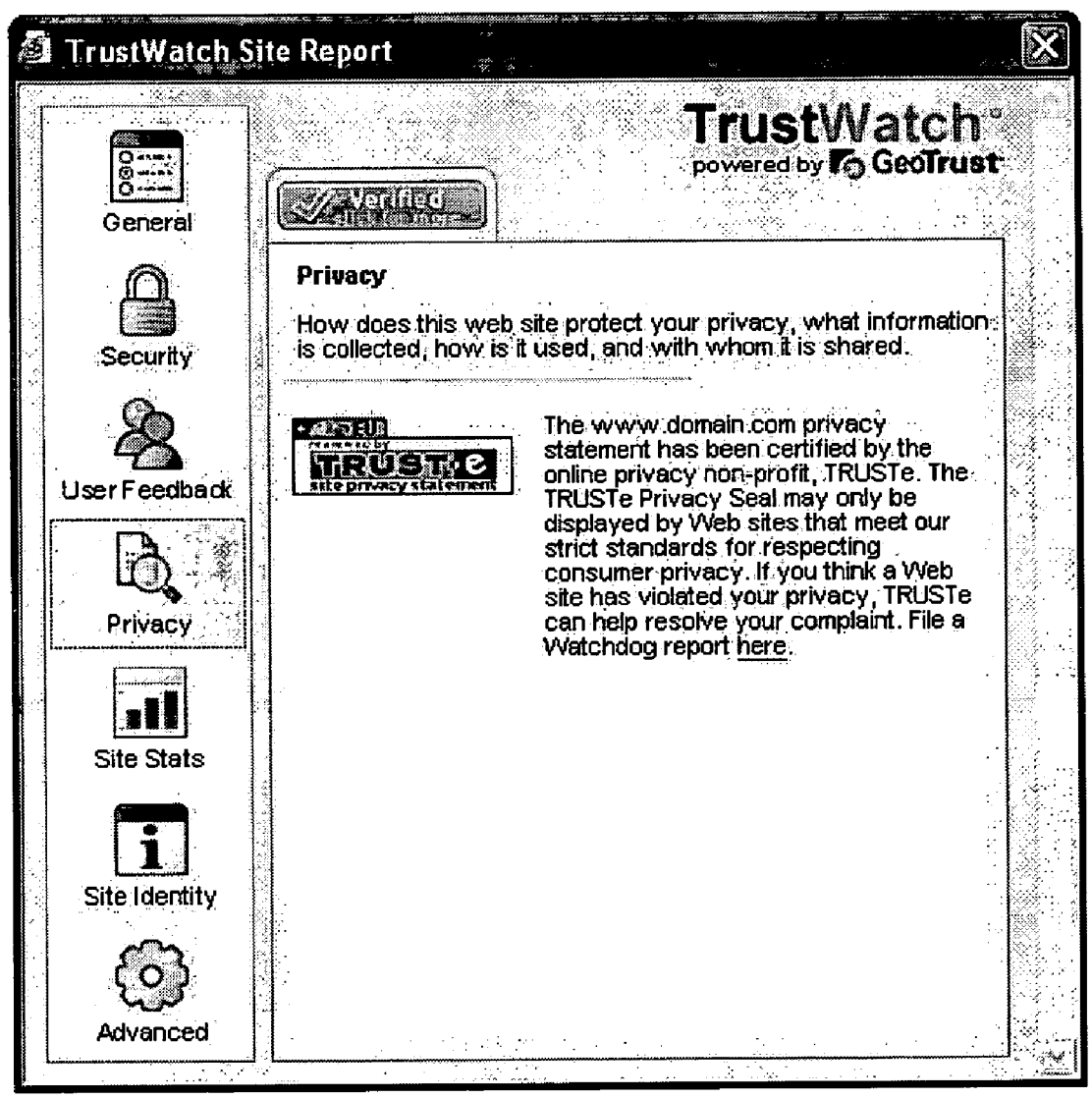

The privacy information (FIG. 8(e)) can include information about whether the site has been certified, such as by TRUSTe, a description of the certification, and a link to file a report.

Figure 8F:
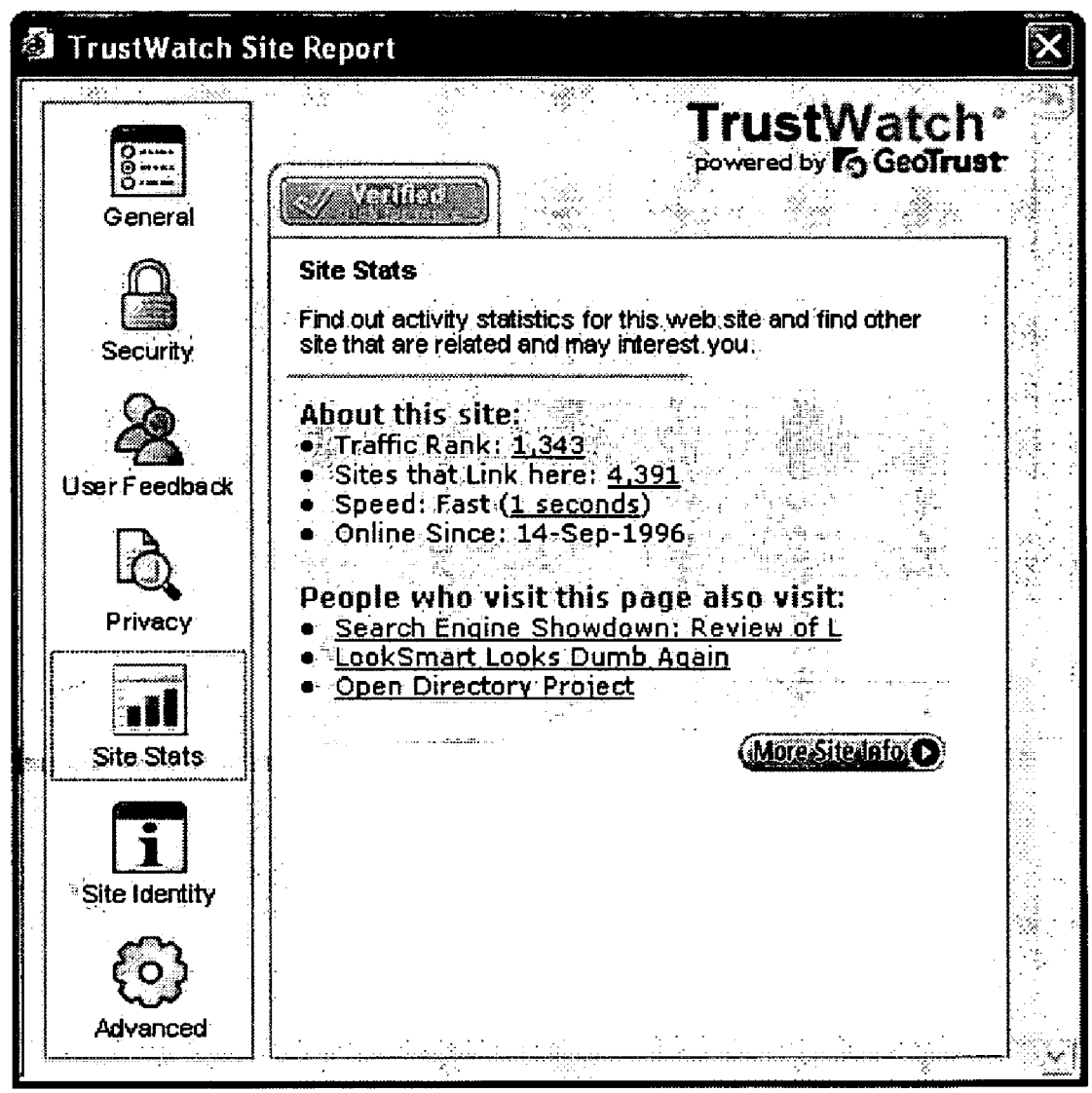

The site statistics information (FIG. 8(f)) can include information such as a traffic rank, number of sites that link to the site, speed of response, number of hits, date of origination, and links to other sites that are or may be related to the site.

Other exemplary uses for the service include for email and instant messaging (IM), in which case the service can be utilized in the event users send links to each other. Virus checking software can make a call to the service. In proxy/gateways devices, in the event a corporate user is going to a URI, the proxy/gateway device or software could interact with the service and decide if the user could go to that URI or not. There could be configuration of thresholds, i.e., with a score above 90 the user can go to and download from the URI, but with a score between 80 and 89 the user can go to, but not download from, the website. The service could also be used in conjunction with IP-based telecommunications networks and systems for voice and data.

An Exemplary Implementation

The service can be implemented in other ways. In another implementation, the service, referred to here as the Trust-Watch service, uses lists and a retrieved or computed score.

The TrustWatch service runs over the Internet, and provides a trust rating, in the form of a numeric score, for a specified location on the Internet. The location is defined by a fully qualified DNS name, and the request can be made from any application including a toolbar. The trust rating in this implementation is determined by two discreet actions. The first is running a scan against a series of lists that contain locations that are known to be trustworthy or known to be untrustworthy. If the location is found on one of the lists, a trust rating is computed or retrieved and returned to the application. If a location does not appear on one of these lists, then the TrustWatch service searches for an X.509 certificate that can be directly or indirectly associated with the location in question. If such a certificate can be found, the service computes a trust rating based on the properties of the certificate and stores it in a list. If a certificate cannot be found, the score is set to 0.

In this implementation, there are six lists: a Black List, a Gray List, a White List, a Caution List, a Known List, a Cache List, and a TRUSTe List. The Black List contains locations that are known to be untrustworthy. A location on this list automatically receives a score of −1. The Gray List can have portions of locations on the blacklist; e.g., a full location address may be on a black list, and the FQDN for the address is put on the gray list. The White List contains a list of locations that are known to be trustworthy; a location on this list automatically receives a score of 2. The Caution List contains a list of strings that are prohibited, such as "visa" or "microsoft". These strings are used to check a domain name, and if a substring match is found, the trust rating is set to 0. The Known List is a list of location names that are known to be trustworthy. If a location is on the Known List, the location is known as being trusted and therefore this location can be accessed directly to perform another trustworthiness review. The Cache List contains a list of locations that have recently been searched. These locations will all have a numerical trust rating score between 0 and 1 that has been computed using an algorithm based on the properties of the location's certificate. The TRUSTe List is a list of locations that have a Trustee privacy seal. This list is not used to compute the trust rating, but is used to provide more detail about the location. A subset of these lists can be used.

In one implementation, when the service receives a specified location name, it first checks the Black List. If the name is on the list, it returns a score of −1. If the name is not on the Black List, it checks the Gray List. If there is a match, a score of 0 is returned, and the service goes to a White List. If the name is on the White List, the service returns a score of 2. If the name is not on the White List, it checks the Cache List. If the name is on the Cache List, the score is retrieved and returned to the requesting application. The score will be between 0 and 1, depending on the properties of the certificate associated with the location. The service then looks to the Known List. If the name is on the Known List, the location name is placed in the search queue and the service will access the site directly and perform and updated trustworthiness report. If the name is not on the Known List, the service checks the Caution List to see if any of the strings in the Caution List appear in the location name. If a match is found, a score of 0 is returned. If no match is found, the location name is placed in the search queue, and a waiting indicator is returned to the requesting application. In short, the service starts by checking one or more lists for locating information material. While certain lists and result values are described here, others could be used.

The service takes location names from the search queue and searches for an X.509 certificate that can be directly related to the location name. It first searches for the fully qualified name using SSL. If a certificate is found, the properties of the certificate are used to determine a trust rating, which can be done based on tables of values or a formula. If a certificate cannot be found, the service then tries to search on the second level domain name of the location using SSL. For example, if the fully qualified name was marketing.geotrust.com, the second level domain name search would be on geotrust.com. If this second level name search turns up a certificate, its properties are used to compute the trust rating. If no certificate is found, several prefixes such as www, secure, and ssl are prepended to the second level domain and the process is repeated. If any of these searches turns up a certificate, its properties are used to compute the trust rating. If no certificate is found after these searches, then the trust rating is set to 0.

A trust rating B can be computed using a formula, an exemplary one of which follows, where K=0.

$$B = \left(\sum_{i=1}^{2} C_i * V_i + K\right) * NMM * CRL * CAQ$$

$C_1$=0.5 and is the coefficient for validity
$C_2$=0.5 and is the coefficient for wildcards
$V_1$ is the validity value, and is
$V_1$=1.0 when the certificate has not expired
$V_1$=0.75 when the certificate has been expired for less than 14 days
$V_1$=0.5 when the certificate has been expired for 15-30 days
$V_1$=0.25 when the certificate has been expired for 31-60 days
$V_1$=0 when the certificate has been expired for more than 60 days
$V_2$ is the wildcard value, and is
$V_1$=1.0 when the certificate is not a wildcard
$V_1$=0.5 when the certificate is a wildcard certificate but does not belong to an ISP
$V_1$=0 when the certificate is a wildcard certificate and does belong to an ISP When the certificate is a wildcard certificate, and the first page of the site contains the strings "ISP" or "host", the domain is considered an ISP domain.

NMM is the name mismatch value
NMM=1.0 when the certificate common name matches the query DNS name and host server name, or when the second level domain name in the certificate's common name matches the second level domain name in the query DNS name and the host server name.
NMM=0 in all other cases
CRL is the certificate revocation value
CRL=1.0 when the certificate is not revoked
CRL=0 when the certificate is revoked
CQA is the certificate authority quality value CQA=1.0 when the CA root key is in the Internet Explorer root store CQA=0 when the CA root key is not in the Internet Explorer root store.

As indicated above, the trust rating can use the validity of the certificate, presence of a wildcard, name match, revocation status, and CA quality value, although not all of these factors would have to be used.

One application that can use the service is a toolbar. The toolbar can display an indicator that can be green, yellow, red, or waiting. A green indicator indicates the location is trustworthy, which means that it has a trust rating equal to or greater than 0.5. A yellow indicator indicates that the location should be accessed with caution, and has a trust rating between 0 and 0.375. A Red indicator indicates that the location is untrustworthy, and has a trust rating less than 0. A waiting indicator indicates that the source is trying to locate the site, and that the user should click on that location again.

If the user clicks on the indicator, a window opens that displays more detail about the location's trust rating with text to describe the meaning of the indicator, and additional information, such as whether the site is verified by TRUSTe and/or other services that provide site seals.

Email Application

Figure 4:
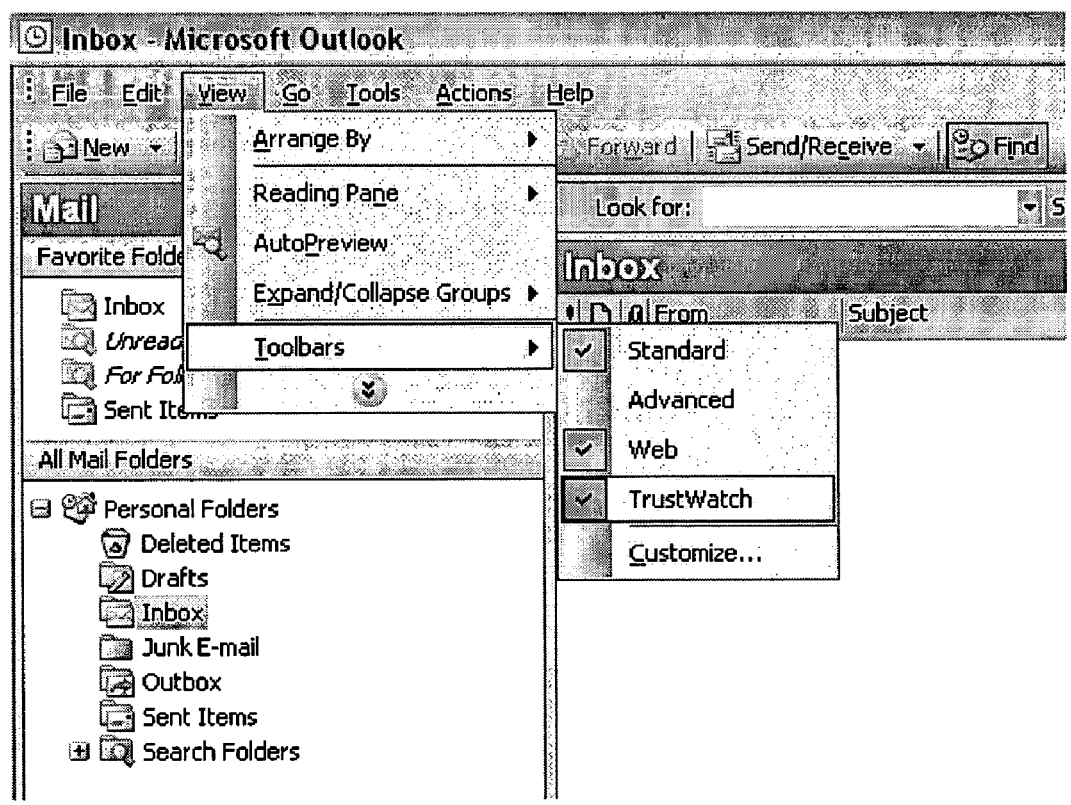
Figure 5:
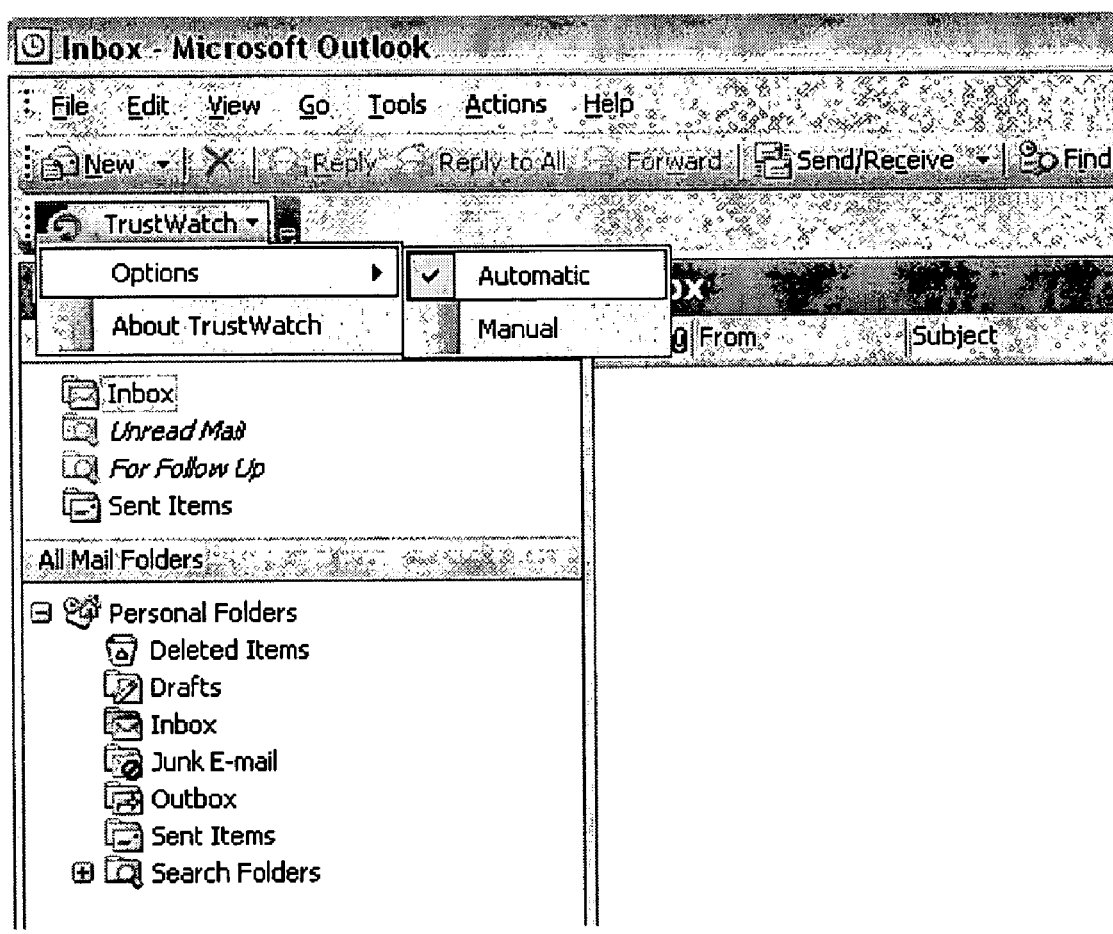
Figure 6:
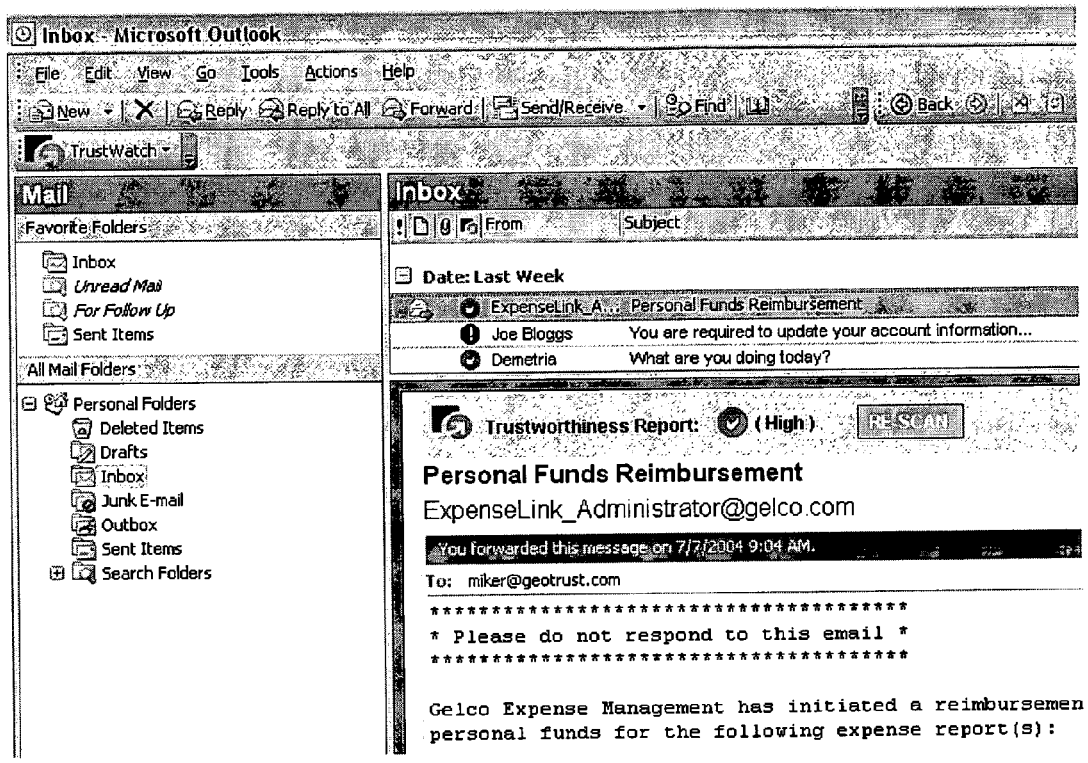

The service can be incorporated into other systems, such as an email system, as shown in FIGS. 4-6. As shown in the figures, the service could be provided as a toolbar and could be made manual or automatic. "Manual" in this case means that the user selects the service when desired; "automatic" in this case means that the service automatically checks all Addresses in the email without separate human input. FIG. 6 shows an example of a report with a "High" trustworthiness indication for the address in the email.

Toolbar Application

Figure 7A:
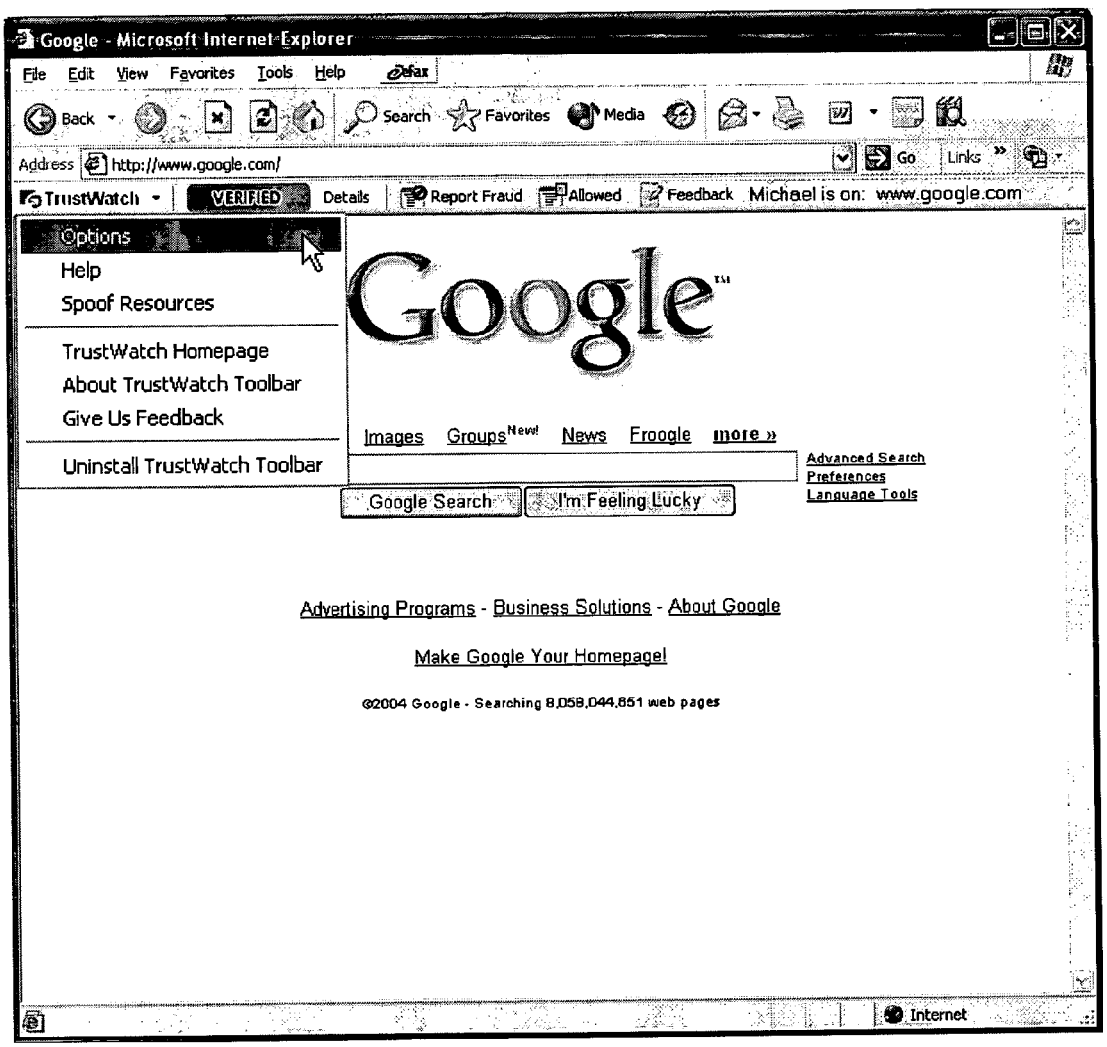
FIGS. 7(a)-7(g) are screen shots showing a client toolbar integrated into a user interface and shown with a searching website in a number of the figures.
Figure 7B:
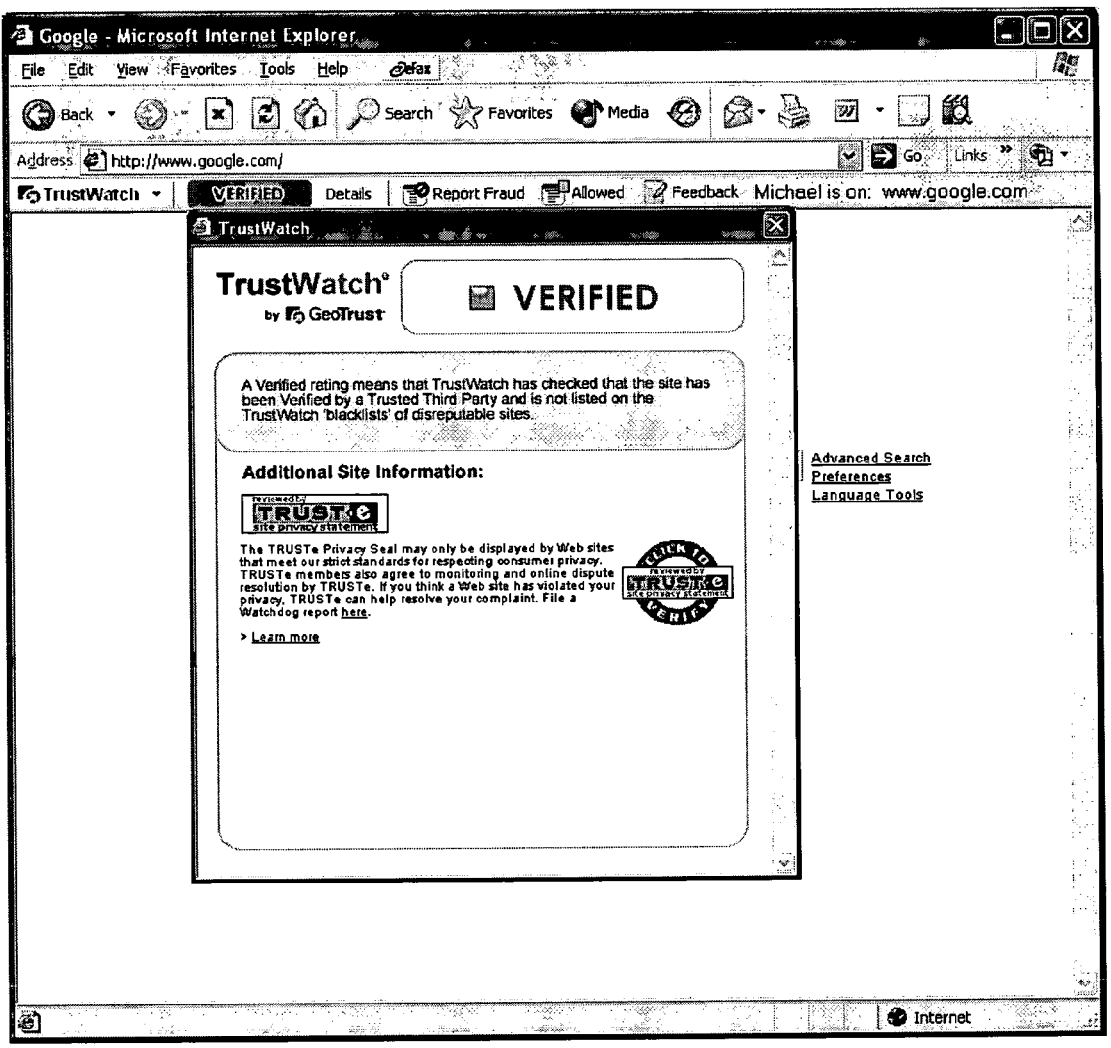
Figure 7C:
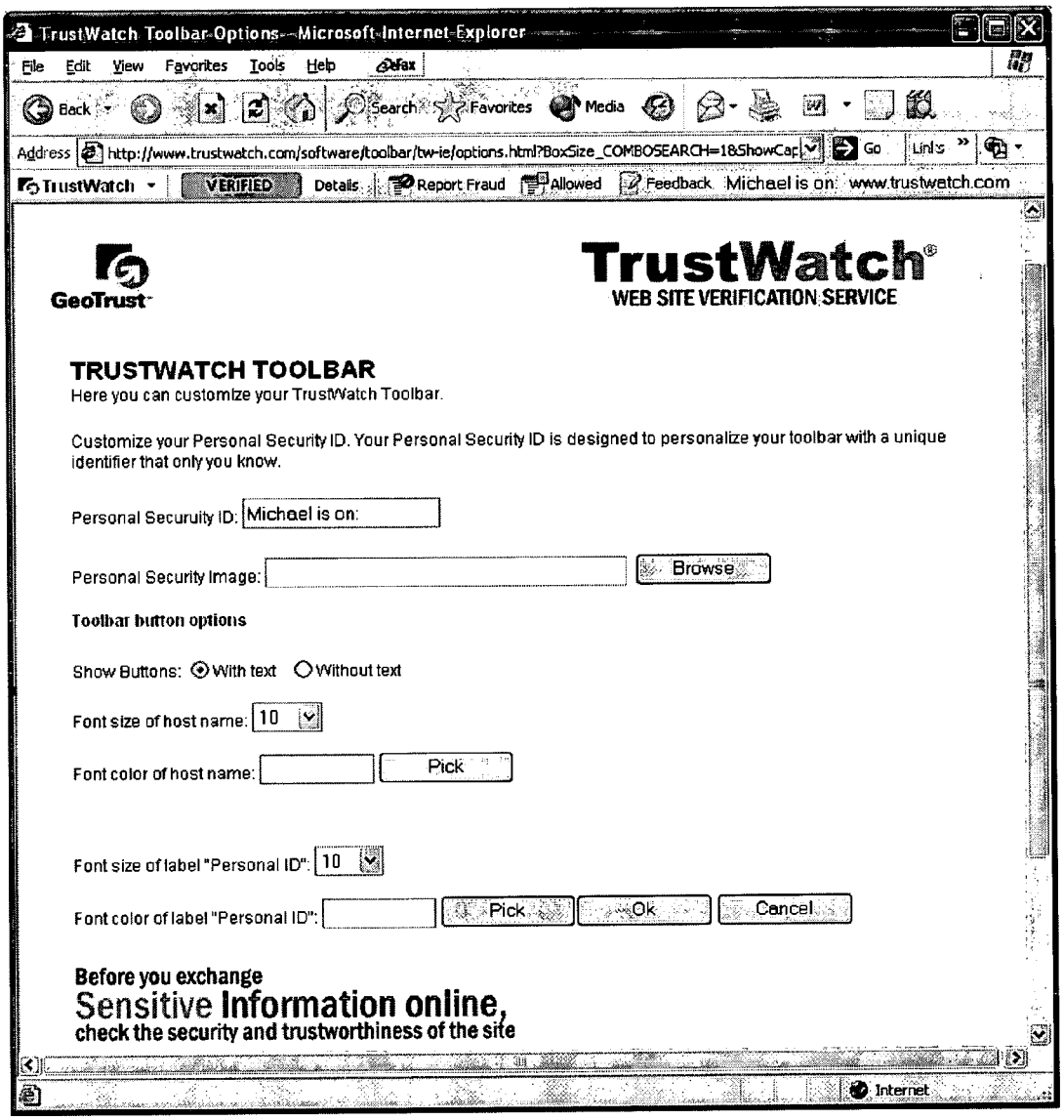

Referring to FIGS. 7(a)-7(c), a user can download, from a remote server, a toolbar that functions as a client to the trustworthiness service. The toolbar, when installed, is added as a plug-in to the user interface of the user's browser. As shown in FIG. 7(a), it takes up a line starting with the term "Trust-Watch," although it could take on any suitable form.

When visiting a site, a user can automatically access the trustworthiness service to check the trustworthiness of the site, and a response (shown here as "Verified") will be provided. As shown in FIG. 7(b), the user can click on the "Verified" button (or some other designation or feature) and look behind the response into more detail into the data used to calculate or determine the trustworthiness level. The toolbar and its functionality can be downloaded without a server that hosts the toolbar having knowledge about the user who downloads (i.e., anonymous downloads), or the server can maintain information about the user or require registration information.

The toolbar is stored on the user's computer and can have features that are accessed with selectable buttons. In the example shown in FIG. 7(a), the toolbar includes a drop down menu of options, an indication of a trustworthiness determination (such as "Verified"), a button to allow the user to "report fraud," an "allowed" button that serves as a popup blocker ("Allowed" will let pop-ups through, and "Blocked" will prevent them from occurring), and a feedback button to comment on the system.

User Identifying Information on the Toolbar

FIG. 7(c) shows an administrative options page that has several options for the user. One option is control over a field that is filled in with user identifying information and website identifying information. The user identifying information, a Personal Security ID, can be text or graphics, such as a small logo. FIG. 7(c) shows a text example stating "Michael is on:". When the user first installs the toolbar, or as desired later through a change of administrative functions by the user, the user can change the personal security ID. On initial installation, the box can have a default (e.g., "Your Name is on").

Figure 7D:
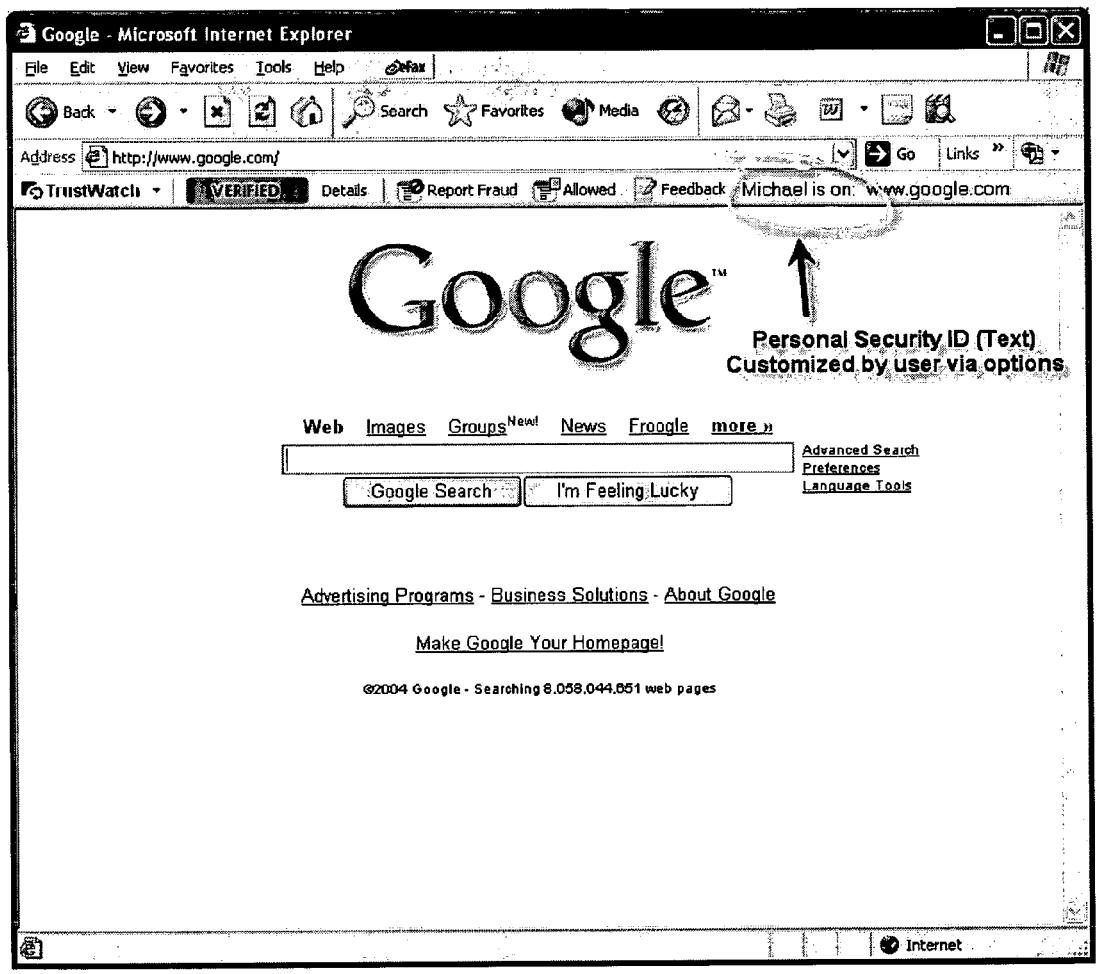
Figure 7E:
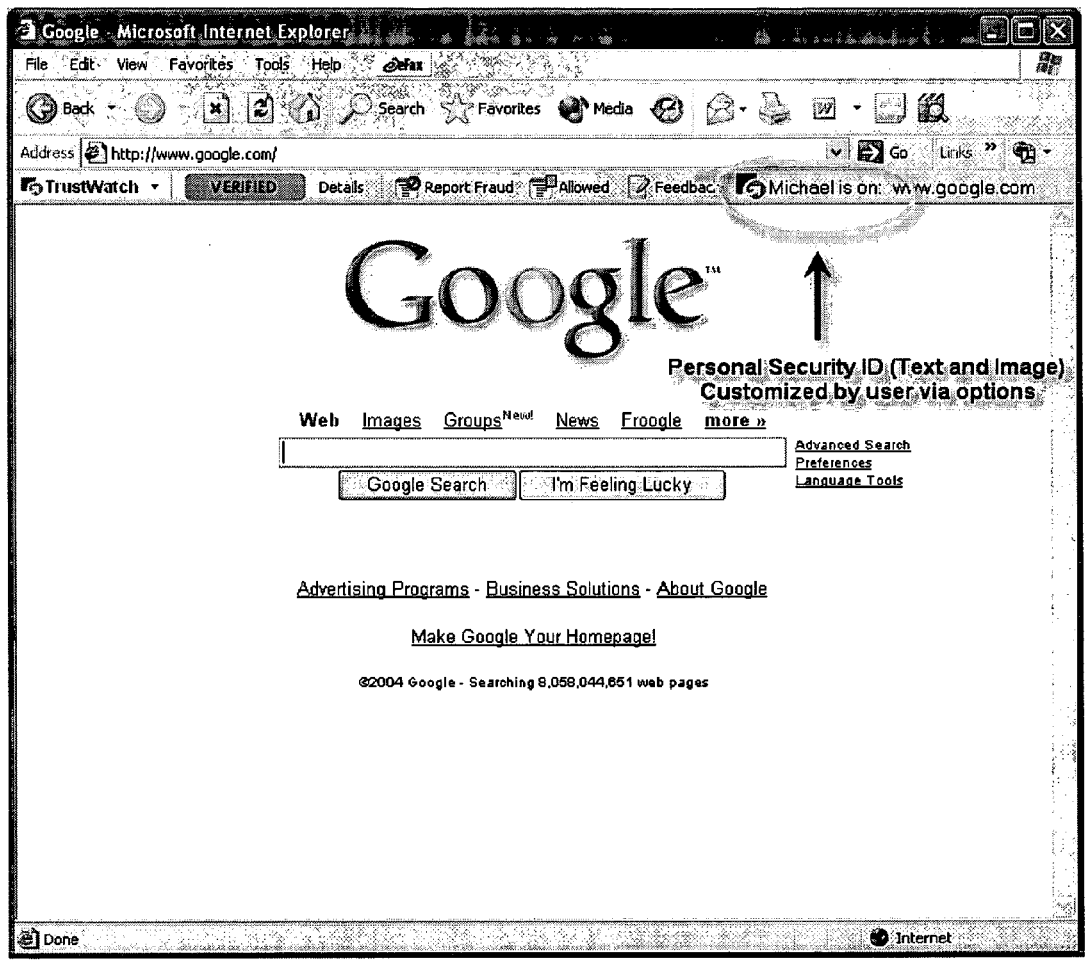
Figure 7F:
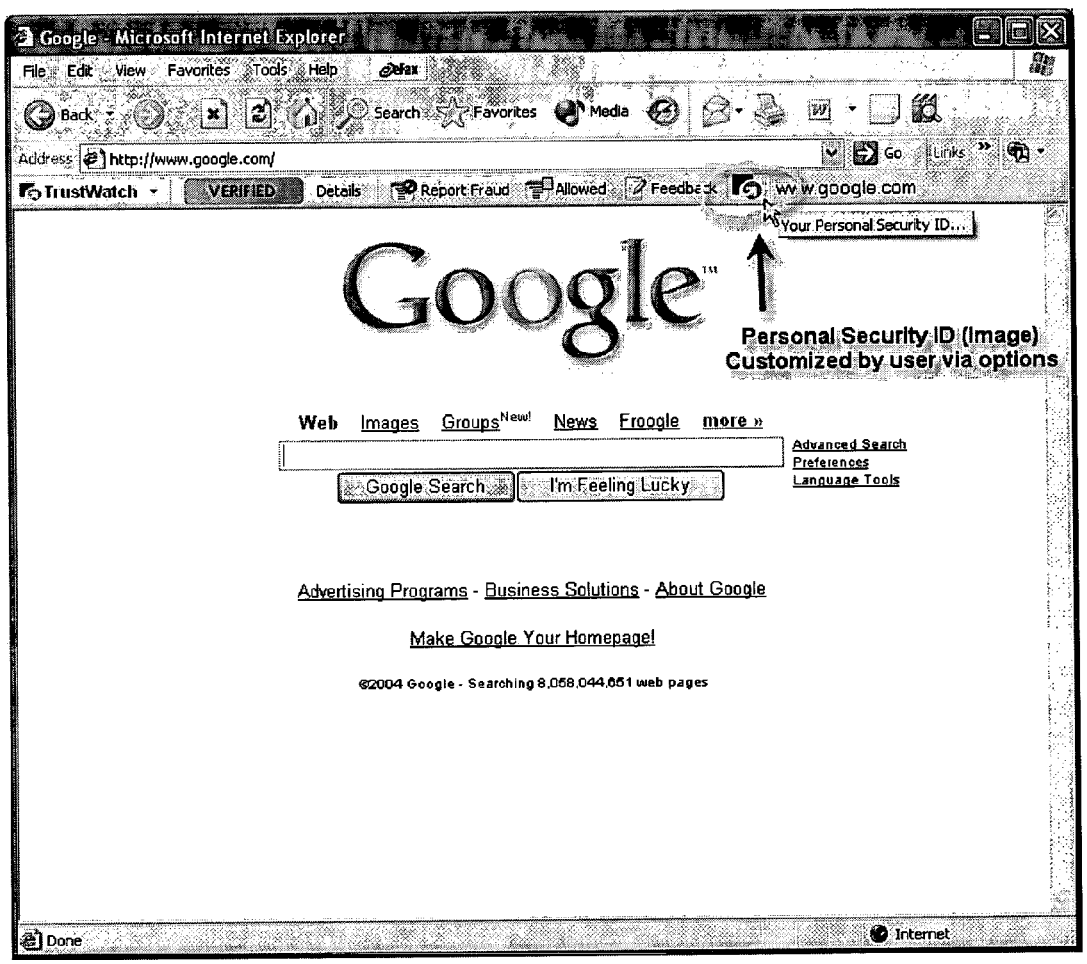

In the particular case shown in FIGS. 7(c) and 7(d), the personal security ID is only done in text. As shown in the next line under general options in FIG. 7(c), the user could browse to a small image to be used as all or part of the user identifying information. The user can thus use text, an image, or a combination of text and an image, for the user identifying information. FIG. 7(e) shows an example of text "Michael is on:" in combination with a small graphic, while FIG. 7(f) shows the personal security ID as a graphic only.

The personal security ID can be stored in a location in memory the user's own computer and need not be stored anywhere else. In use, the system reads the stored personal security ID (text and/or image) and writes that information into the toolbar as shown on the screen. Thus, when the toolbar is visible, it should show the personal security ID as stored. This process helps to prevent a hacker from providing text as an image to overlay the toolbar and deceive the user. For example, a hacker could overlay an image that says "Your Name is on", but if the user had changed the text in the user identifying region from "Your Name is on" to "Joe is on", the user could see that what is in the toolbar's user identifying space does not match what should be in the space, and thus conclude that there has been an attack.

An image can provide even greater protection because there are still more options. The image could appear with, or instead of, the text in the same area, or there could be a separate space for the image.

Domain Name Information on the Toolbar

Figure 7G:
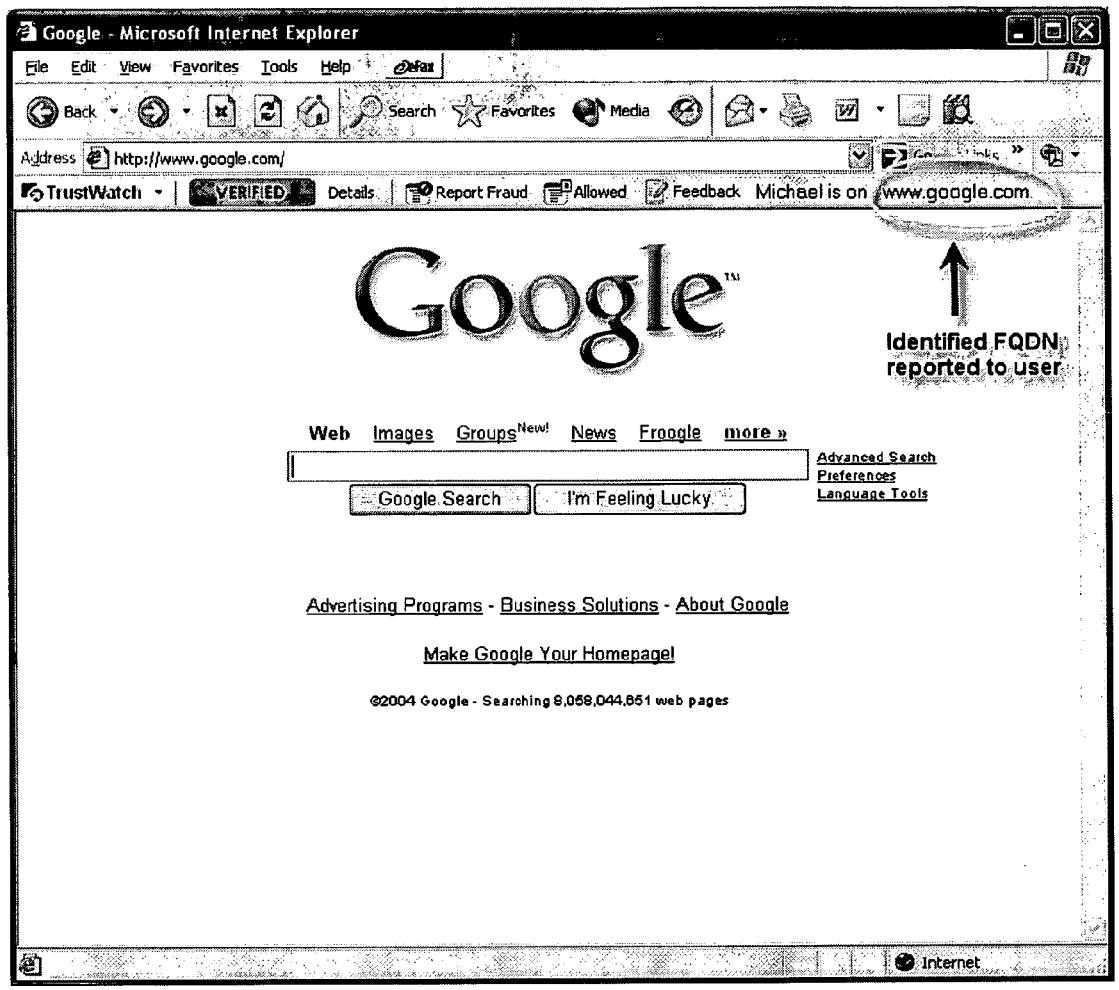

As another protection against hackers, and especially against the overlay deception in which the hacker overlays text that covers the address, the toolbar also indicates the fully qualified domain name (FQDN) of the web site that is being visited as shown in the circle in FIG. 7(g). In normal use, this domain name should match the domain name that is shown in the address box. One tactic that can be used by hackers is to provide overlay text into the address box. For example, in a phishing scam, a hacker could send an email with a link that appears to be to the First National Bank. When the user clicks to be directed to the First National Bank, the website being visited is actually a fraudulent site called "www.TenthNationalBank.com". To deceive the user, the hacker creates text in the form of an image that overlays the text in the user's address box to read "www.FirstNationalBank.com".

With the system described here, the user can look at the toolbar and look at the address to make sure that the domain names match. In the example above, if the text were overlaid, the user would see "www.FirstNationalBank.com" in the address box, but the toolbar would independently indicate that the site being visited was really "www.TenthNationalBank.com". Because these two pieces of information do not match, the user could determine that there is a potential problem, such as a hacker with a phishing scam, and not use the site.

Caching

With the toolbar installed, a user can go to a website that can have many pages of content. For example, a user could go to an online bookstore and browse for books, read reviews, and provide other tasks on that website. The toolbar, functioning as a client to the service, could check with the service with each access each time to get a score or indication of the trustworthiness of that site (e.g., "Verified", "Not Verified", or "Warning").

Different sites can have different degrees of risk. Some sites can have a very high degree of trust, in which case it would be unlikely that over any given period of time that website has been hacked. In order to reduce the number of accesses to the service and to provide greater efficiency, the trustworthiness level of the site (which could be at any level) can be cached on the user's computer. Once verified, the service can provide information back to the user indicating a trustworthiness level (e.g., that the domain name is verified), and that it is to be considered to have that same level for some period of time.

For some sites that have significant safeguards or that are certified by certifying bodies with high standards, this period could be expressed in terms of a number of hours. For sites that do not meet such criteria, the time that the trustworthiness rating is considered valid could be expressed in a shorter period such as a lesser number of hours or number of minutes. The system could keep the time open regardless of whether the user visits other sites in the meantime, or it could assume the same verification status only as long as the user is on that site.

The user is thus caching the verification status and the trustworthiness of the site for some period of time, and the period of time can be controlled or adjusted based on a set of rules.

Saving Information

With this service, the service could retain information about the user, although it also can be started and operated with no user information being retained by the service. In other words, the service need not retain any information about who has the toolbar, and information relating to the Personal ID, personal image, and site caching and timing are all stored on the user computer. In a networked system, such as a corporate computer system, some or all of this information could be maintained at a central location instead of, or in addition to, the local computer.

Hardware and Software

In the various embodiments above, the service would typically be implemented on general purpose processing hardware, such as one or more servers, or some other type of computer, programmed with appropriate software in high level language or some scripting language, or some combination. The service could also be provided through use and whole or in part of applications, specific circuitry or logic. Primarily, the software will include scripts for accessing databases and returning results, e.g., through interfaces from a server to the Internet or through other channels, and further processing for using the results to provide information and to provide a trustworthiness report.

Having described certain embodiments, it should be understood that modifications can be made without departing from the scope of the inventions described here. For example, while certain specific checks are identified here, as other repositories, databases and sources of information become available, they could also be used as part of the process.

The invention claimed is:

1. A method comprising:
   determining by a computer processor the trustworthiness of a location on the Internet and identifying for that location a numerical trust rating over a numerical range; and
   providing trustworthiness information based on the trust rating to a user, wherein determining includes:
   accessing one or more lists of known trustworthy or untrustworthy locations, and if a definitive determination is not made that a location is trustworthy or not trustworthy,
   searching for certificates that are directly related to the location, and if a certificate directly related to the location is not found,
   searching for certificates that are indirectly related to the location, the searching for certificates indirectly related to the location including determining a second level domain name of the location and prepending one or more predetermined prefixes to the second level domain name, and
   if a certificate is identified as directly related or indirectly related to the location, the determining is based on a calculation including properties of the certificate related to the location.

2. The method of claim 1, wherein the certificate is an X.509 certificate.

3. The method of claim 1, wherein the determining includes checking for the presence of predetermined strings within the name of the Internet location.

4. The method of claim 1, wherein the determining includes using as factors properties of a certificate related to the location.

5. The method of claim 4, wherein the properties include one or more of the following: the location's certificate type, certificate validity date, subject name match, certificate revocation status, and the ubiquity of the certificate's root.

6. The method of claim 4, wherein the properties include all of the following: the location's certificate type, certificate validity date, subject name match, certificate revocation status, and the ubiquity of the certificate's root.

7. The method of claim 6, wherein the property includes using determining the formula $B=\Sigma(C_i*V_i+K)*CAQ*NMM*CRL$, where C represents a coefficient, K is a constant, V relates to a validity value or a wildcard value, NMM relates to a subject name match, CRL relates to certificate revocation status, and CAQ relates to a certificate authority's quality.

8. The method of claim 1, wherein the lists include a black list of locations known to be untrustworthy.

9. The method of claim 1, wherein the lists include and a white list of locations known to be trustworthy.

10. The method of claim 1, wherein the lists include a cached list of previously accessed locations and previously determined trustworthy values.

11. The method of claim 1, wherein the lists include a list of strings used to match against the name of a location.

12. The method of claim 1, further comprising caching a certificate trust rating, and periodically refreshing that trust rating at defined time periods.

13. The method of claim 12, wherein the time period for refreshing is based on a reliability of the location.

14. The method of claim 1, wherein the determining is done automatically for at least some sites.

15. The method of claim 1, wherein the determining is done only when a user requests a trust rating.

16. The method of claim 1, wherein the location is an email address.

17. The method of claim 1, wherein the trust ratings are organized in ranges and the ranges are associated with colors.

18. The method of claim 1, wherein the determining and providing are performed automatically for each Internet location listed on a page in response to a search.

19. A storage medium having a software program for implementing the method of claim 1.

20. A method comprising:
   determining trustworthiness by a computer processor of a location accessed by a user on the Internet including:
   comparing by a computer processor the location to one or more lists of known trustworthy or untrustworthy sites, and if a definitive determination is not made that a location is trustworthy or not trustworthy,
   attempting to identify a certificate that is directly related to the location, and if a certificate directly related to the location is not identified,
   attempting to identify a certificate that is indirectly related to that location,
   if a certificate is identified as directly related or indirectly related to the location, the determining is based on a calculation including properties of the certificate related to the location; and
   providing trustworthiness information based on the determined trustworthiness to a user,
   wherein the attempting to identify a certificate indirectly related to the location includes determining a second level domain name of the location, and prepending one or more predetermined prefixes to the second level domain name.

21. The method of claim 20, wherein the certificate is an X.509 certificate.

22. The method of claim 20, wherein the determining includes checking for the presence of predetermined strings within the name of the Internet location.

23. The method of claim 20, wherein the determining includes using as factors properties of a certificate related to the location.

24. The method of claim 23, wherein the properties include one or more of the following: the location's certificate type, certificate validity date, subject name match, certificate revocation status, and the ubiquity of the certificate's root.

25. The method of claim 23, wherein the properties include all of the following: the location's certificate type, certificate validity date, subject name match, certificate revocation status, and the ubiquity of the certificate's root.

26. The method of claim 25, wherein the property includes using determining the formula $B=\Sigma(C_i*V_i+K)*CAQ*NMM*CRL$ where C represents a coefficient, K is a constant, V relates to a validity value or a wildcard value, NMM relates to a subject name match, CRL relates to certificate revocation status, and CAQ relates to a certificate authority's quality.

27. The method of claim 20, wherein the lists include a cached list of previously accessed locations and previously determined trustworthy values.

28. The method of claim 20, wherein the lists include a list of strings used to match against the name of a location.

29. The method of claim 20, further comprising caching a certificate trust rating, and periodically refreshing that trust rating at defined time periods.

30. The method of claim 29, wherein the time period for refreshing is based on a reliability of the location.

31. The method of claim 20, wherein the determining is done automatically for at least some sites.

32. The method of claim 20, wherein the determining is done only when a user requests a trust rating.

33. The method of claim 20, wherein the location is an email address.

34. A storage medium having a software program for implementing the method of claim 20.

35. A method comprising:
   a computer implemented internet search engine responding to a user entered keyword query for providing a list of links for sites based on the keyword; and for a plurality of the links, providing an indication of the trustworthiness of the sites to which the links refer,
   wherein providing an indication of the trustworthiness of the sites includes:
   accessing one or more lists of known trustworthy or untrustworthy sites, and if a definitive determination is not made that a site is trustworthy or not trustworthy,
   attempting to identify by a computer processor a certificate that is directly related to the site, and if a certificate directly related to the sites is not identified,
   attempting to identify by the computer processor a certificate indirectly related to the site including determining a second level domain name of the site, and prepending one or more predetermined prefixes to the second level domain name, and
   if a certificate is identified as directly related or indirectly related to the site, the indication of the trustworthiness of the site is further based on a calculation including properties of the certificate related to the site.

36. The method of claim 35, wherein the indication of trustworthiness is provided automatically for all of the links.

37. The method of claim 35, further comprising providing a site report including security information and privacy information for each of the sites without the user accessing the sites.

38. The method of claim 35, wherein the indication of trustworthiness is one of a number of icons indicating that the site is trusted, not trusted, or questionable.

39. A system comprising:
   a communication device; and
   a processor,
   wherein the processor is configured to determine the trustworthiness of a location on the Internet and to identify for that location a numerical trust rating over a numerical range, and to provide through an interface trustworthiness information based on the trust rating to a user, and
   wherein the determining includes:
   accessing one or more lists of known trustworthy or untrustworthy locations, and if a definitive determination is not made that a location is trustworthy or not trustworthy,
   attempting to identify by a computer processor a certificate that is directly related to the location, and if a certificate directly related to the location is not identified,
   attempting to identify a certificate indirectly related to the location determining a second level domain name of the location, and prepending one or more predetermined prefixes to the second level domain name, and
   if a certificate is identified as directly related or indirectly related to the location, the indication of the trustworthiness of the location is further based on a calculation including properties of the certificate related to the location.

* * * * *